US008536292B2

(12) United States Patent
Mongoin et al.

(10) Patent No.: US 8,536,292 B2
(45) Date of Patent: Sep. 17, 2013

(54) METHOD OF PRODUCING AN IMPACT-RESISTANT THERMOPLASTIC RESIN

(75) Inventors: Jacques Mongoin, Quincieux (FR); Matthias Buri, Rothrist (CH); Patrick Gane, Rothrist (CH); Olivier Guerret, La Tour de Salvagny (FR); Jacky Rousset, Baneins (FR); Georges Saunders, Brandon, VT (US)

(73) Assignees: Omya International AG, Oftringen (CH); Coatex S.A.S., Genay (FR)

( * ) Notice: Subject to any disclaimer, the term of this patent is extended or adjusted under 35 U.S.C. 154(b) by 319 days.

(21) Appl. No.: 12/084,437

(22) PCT Filed: Oct. 23, 2006

(86) PCT No.: PCT/IB2006/003054
§ 371 (c)(1),
(2), (4) Date: May 1, 2008

(87) PCT Pub. No.: WO2007/052122
PCT Pub. Date: May 10, 2007

(65) Prior Publication Data
US 2009/0270543 A1    Oct. 29, 2009

(30) Foreign Application Priority Data
Nov. 4, 2005 (FR) ..................... 05 11274

(51) Int. Cl.
C08G 77/42 (2006.01)
C08G 77/46 (2006.01)
C08L 27/16 (2006.01)
C08L 27/24 (2006.01)
C08L 25/10 (2006.01)

(52) U.S. Cl.
USPC ............ 528/25; 524/556; 524/425; 524/424; 524/426; 528/425

(58) Field of Classification Search
USPC ............... 524/426, 425, 424, 556; 528/25, 528/425
See application file for complete search history.

(56) References Cited

U.S. PATENT DOCUMENTS

| | | | |
|---|---|---|---|
| 5,116,910 A | 5/1992 | Tone et al. | |
| 5,225,491 A | 7/1993 | Yu | |
| 5,491,209 A | 2/1996 | Helmer et al. | |
| 5,506,320 A | 4/1996 | Yu | |
| 5,686,528 A * | 11/1997 | Wills et al. | 525/68 |
| 5,773,520 A | 6/1998 | Bertelo et al. | |
| 5,932,641 A | 8/1999 | Blanchard et al. | |
| 6,093,764 A | 7/2000 | Egraz et al. | |
| 7,470,739 B2 | 12/2008 | Gane et al. | |
| 7,514,488 B2 | 4/2009 | Gane et al. | |
| 7,825,192 B2 | 11/2010 | Gane et al. | |
| 2002/0058752 A1 | 5/2002 | Lau et al. | |
| 2006/0009560 A1* | 1/2006 | Gane et al. | 524/425 |
| 2006/0106186 A1* | 5/2006 | Dupont et al. | 528/25 |
| 2006/0142498 A1 | 6/2006 | Gane et al. | |
| 2007/0299183 A1 | 12/2007 | Gane et al. | |

FOREIGN PATENT DOCUMENTS

| | | |
|---|---|---|
| EP | 0610534 A1 | 8/1994 |
| EP | 0 691 336 A | 1/1996 |
| FR | 1205258 A | 2/1960 |
| FR | 0 868 072 A | 9/2005 |
| GB | 2 051 096 A | 1/1981 |
| JP | 4063818 A | 2/1992 |
| JP | 6073632 A | 3/1994 |
| WO | 0077058 A1 | 12/2000 |
| WO | WO 01/07494 A | 2/2001 |
| WO | 0196007 A1 | 12/2001 |
| WO | 03062292 A1 | 7/2003 |
| WO | WO 03/072834 A | 9/2003 |
| WO | 2004035678 A1 | 4/2004 |
| WO | 2004041882 A1 | 5/2004 |
| WO | 2004041883 A1 | 5/2004 |
| WO | WO 2004/044022 A | 5/2004 |
| WO | 2005063877 A1 | 7/2005 |

OTHER PUBLICATIONS

The International Search Report for PCT Application No. PCT/IB2006/00003054, mailed Jan. 23, 2007.
The Written Opinion of the International Searching Authority for PCT Application No. PCT/IB2006/003054, mailed Jan. 23, 2007.

* cited by examiner

Primary Examiner — James J Seidleck
Assistant Examiner — Deve E Valdez
(74) Attorney, Agent, or Firm — Amster, Rothstein & Ebenstein LLP

(57) ABSTRACT

The invention concerns a process to manufacture a thermoplastic resin charged with mineral or carbonated matter, and possibly containing an organic impact modifier, through the introduction into the said resin of a comb polymer with at least one ethylenic unsaturation monomer, to which is grafted at least one polyalkylene oxide function. The resins then obtained which also form the subject of the invention have an improved impact resistance without their rigidity being degraded.

69 Claims, No Drawings

METHOD OF PRODUCING AN IMPACT-RESISTANT THERMOPLASTIC RESIN

This is a U.S. national phase of PCT Application No. PCT/IB2006/003054, filed Oct. 23, 2006, and claims priority to French Application No. 05 11274, filed Nov. 4, 2005.

The present invention relates to the sector of thermoplastic materials reinforced against impact, whilst retaining a satisfactory rigidity.

The invention firstly concerns a process to manufacture a thermoplastic resin charged with mineral or carbonated matter, and possibly containing an organic impact modifier, through the introduction into the said resin of a comb polymer with at least one ethylenic unsaturation monomer, to which is grafted at least one polyalkylene oxide function.

The invention also concerns the thermoplastic materials thus obtained, which have an improved impact resistance and a maintained rigidity, compared to the same compositions not containing the said comb polymers.

Throughout the present Application, the expression "comb polymer" designates a polymer consisting of an essentially linear backbone, to which are grafted at least 2 lateral segments consisting of at least one "macromonomer". The term "macromonomer" designates a polymer or copolymer which is not soluble in water, and having at least one terminal group having an unsaturated ethylenic function.

Thermoplastic materials are used in many manufactured objects, since their methods of transformation by injection, pressing, casting or calendaring enable them to be used easily. These materials are characterised by their rigidity—a criterion for their use—and also by their fusion or glass transition temperature—a criterion for their transformation—such as they are well known to the skilled man in the art, a formulator of plastics, notably of charged thermoplastic materials.

Plastics are often fragile and must be reinforced to resist stresses such as impacts or elongations. A method well known to the skilled man in the art with a view to improving these properties consists in adding to the said plastics reinforcing additives, referred to in the present Application by means of the expressions "impact modifiers" or "shock modifiers" or "impact additives". There are two types of such additives: organic or inorganic.

Organic impact modifiers generally have properties of the elastomer type. Among these additives, one can mention notably copolymers of the styrene-butadiene type (as described in documents WO 2005/063 877 or WO 2004/035 678) and particles of the core-shell type, notably containing (meth)acrylate compounds both in the core and in the shell (as described notably in documents U.S. Pat. No. 5,773,520 or WO 2003/062 292).

The addition of such additives generally leads to a lowering of the material module, which subsequently undermines its use. The reflex of the skilled man in the art is then to add to the thermoplastic material mineral or carbonated fillers such as carbon black, silica, calcium carbonate, kaolin or again talc, the said fillers being intended to compensate the loss of rigidity caused by the impact reinforcing additives. However, such fillers limit the mechanical properties of the thermoplastic material, and the skilled man in the art must then seek a compromise between the rigidity of the formulation and its mechanical properties.

It is also known to use inorganic impact modifying additives, which are presented in the form of mineral or carbonated fillers. As such, the said fillers, in addition to their ability to reinforce the thermoplastic resin in terms of rigidity as described above, also have the ability to improve the impact resistance of the said resin: this is notably what is taught by document FR 1 205 258, which describes vinyl poly-chloride-based thermoplastic compositions, the impact resistance of which is improved through the addition of calcium carbonate, titanium dioxide or carbon black. Similarly, it is known, as indicated in the document "Mineral additives for the plastic industry" (Applied Technology Service, Plastics, OMYA™ International AG, Oftringen, Switzerland), that calcium carbonate, talc, kaolin, mica and wollastonite have an influence on the impact resistance properties of charged PVC resins; it is even stipulated that this resistance is above all governed by the shape of the mineral particles and by their compatibility with the polymer matrix, without, however, stipulating in what sense these factors affect impact resistance. As an example, the Applicant can cite the precipitated calcium carbonates sold by the company SOLVAY™ under the name Socal™ 312, and which enable the impact resistance of PVC resins to be improved, whilst retaining their rigidity, avoiding completely use of organic impact modifiers. However, the limit in increasing the proportion of calcium carbonate in PVC lies in the welding problems then encountered, which are very familiar to the skilled man in the art.

In the case of a thermoplastic material consisting of a resin, a mineral filler, and in the absence of an organic impact modifier as indicated above, the Applicant has developed a process which uses particular comb polymers described below in the Application, and which allow, in a completely surprising manner, the impact resistance of the thermoplastic resins thus manufactured to be improved, without however impairing their rigidity. In this sense, the comb polymers used in this process enable the skilled man in the art to exacerbate the impact resistance power of the charged resin, without reducing its rigidity: by this means, it is the combination of the mineral or carbonated filler and the said comb polymers which plays the role of impact modifier, since such an impact modifier is much more effective than the mineral or carbonated filler used on its own. This new possibility constitutes a very clear technical advantage in the field of manufacture of thermoplastic materials.

In the case of a thermoplastic material consisting of a resin, a mineral filler, and in the presence of an organic impact modifier, which constitutes the other current side of the state of the technique, the process developed by the Applicant enables, thanks to the particular comb polymers which he uses, the impact resistance of the thermoplastic resins to be increased without however reducing their rigidity. In this sense, the process according to the invention develops a positive synergy between the mineral or carbonated fillers and the organic impact modifying additives: by this means the limits of the rigidity/impact properties compromise are extended. By this means, and if he is seeking to reduce the quantity of organic impact modifiers, the skilled man in the art may, using the present invention, maintain the same impact resistance performance specifications and maintain the rigidity of the resin. According to another variant, and if he wishes to work with a constant rate of organic impact modifiers, the skilled man in the art may, using the present invention, significantly improve the impact resistance of the resin whilst maintaining its rigidity.

In conclusion, the process according to the invention constitutes a "universal" solution to the impact resistance/rigidity of thermoplastic resins compromise, since it gives the skilled man in the art advantages:
   both in the case of the use of an organic impact modifier, in which case it enables a positive synergy to be achieved between the said modifier and the mineral or carbonated filler: possibility of reducing the quantity of impact modifier and of obtaining the same impact resistance and rigidity performance specifications, or maintenance of this quantity but increase of impact resistance and maintenance of rigidity;

and without an organic impact modifier: the impact resistance performance properties initially provided by the mineral or carbonated filler are "doped" by the present invention, without however degrading the rigidity of the resin.

This invention is based on a process for manufacturing a thermoplastic material, containing:

(a) at least one thermoplastic resin,
(b) at least one mineral or carbonated filler,
(c) possibly at least one other additive chosen from among a thermal stabiliser and/or a UV stabiliser and/or a lubricant and/or a rheology modifier and/or an organic impact modifier, and characterised in that at least one comb polymer, containing at least one polyalkylene oxide function grafted on to a least one ethylenic unsaturated monomer, is introduced into the above-mentioned composition.

Furthermore, another of originality of the invention is that the comb polymer which it uses may be introduced into the thermoplastic composition by very varied methods, which represent flexibility for the skilled man in the art.

As such, the said polymer may be introduced via the mineral or carbonated filler, once the latter has been ground in the presence of the said polymer, either in a dry medium or in a wet medium, and then dried, treated and possibly classified.

The polymer may also be introduced via the mineral or carbonated filler, the latter having been introduced into a suspension and/or an aqueous dispersion containing the mineral or carbonated filler, and the product obtained having then been dried, treated and possibly classified.

The said polymer may also be introduced in the form of dry powder with the other constituents a), b) and c) of the final product. As such, it may have been previously mixed with one or more of these constituents, the product obtained then being mixed with the other constituents.

Finally, the said polymer may be introduced into an emulsion and/or an aqueous suspension containing at least one of the additives designated in part c), i.e. an additive chosen from among a thermal stabiliser and/or a UV stabiliser and/or a lubricant and/or a rheology modifier and/or an organic impact modifier.

The Applicant indicates that in the treatment field as indicated above, compounds of the fatty acid type are generally used.

In the technical domain of the invention, i.e. in thermoplastic compositions which may possibly be charged, and with improved impact properties, the skilled man in the art is aware of a certain number of documents: this is a first part of the state of the technique, the teaching of which is discussed in greater detail in the remainder of the present Application.

Secondly, the Applicant is also aware of other documents which use comb polymers containing a polyalkylene oxide function, but in often very different technical fields, and with a view to resolving very different problems. This second part of the state of the technique is also discussed in remainder of the Application.

Firstly, there are a certain number of documents relating to the problem of the improvement of impact resistance in thermoplastic resins, and which offer solutions based on the use of particular polymers. Such documents are discussed in remainder of the present application. As a prelude to this part, the Applicant is however keen to indicate that none of them reveals or even suggests the possibility of using a mineral or carbonated filler in the thermoplastic systems which are envisaged, with a view to exacerbating this impact resistance. And, as has already been mentioned, it is the joint presence of the polymers described in the present invention and mineral and carbonated fillers which give, in a surprising manner, an improved impact resistance, whilst maintaining the rigidity of the resin: this is indeed one of the essential characteristics of the present invention.

Document U.S. Pat. No. 5,506,320 concerns the improvement of the properties of rigidity and flexibility of thermosetting resins, such as, notably, acrylic, polyester, polyurethane, epoxide, or indeed vinyl ester resins. The provided solution consists in using polymers of the comb type which are fired in the presence of the said resin, so as to obtain a uniform mixture, the above-mentioned properties of which are thereby improved. The said polymers have a backbone formed from an ethylenic unsaturation polymer, on to which are grafted chains of the polyether, polyester, polystyrene or polymethacrylate type. The examples notably show an increased rigidity of the thermosetting resin containing such polymers, compared to the same compositions containing polymers sold by the company GOODRICHT™ under the term Hycar™, the impact modifying function of which is well known to the skilled man in the art. This document neither reveals nor suggests any possibility of combination between the polymers it describes, and the organic impact modifiers of the prior art, which is one of the objects of the present invention. Secondly, document U.S. Pat. No. 5,506,320 does not reveal that the polymers it uses can be used in a combination with mineral fillers in a thermoplastic material, with a view to improving further this impact resistance, which is also one of the main objects of the present invention. Finally, this document neither reveals nor suggests the particular grafting of the polyalkylene oxide function on to a monomer having an ethylenic unsaturation, which is one of the essential characteristics of the process forming the subject of the present invention.

Document U.S. Pat. No. 5,116,910, for its part, seeks to improve the properties of transparency, mechanical resistance, resistance to environmental conditions (notably to the sun) and impact resistance of acrylic resins. The proposed solution lies in the use of acrylic copolymers of the comb type obtained by copolymerising a methacrylate ester polymer having one vinyl link with an acrylic ester monomer. In a mixture with a copolymer of the methyl polymethacrylate type, a resin with improved impact resistance properties is obtained. It clearly appears that the function of the copolymers described in document U.S. Pat. No. 5,116,910 consists in being substituted for the impact modifiers of the prior art: consequently, such a document neither reveals nor suggests any combination between the said polymers and the impact modifiers of the prior art. Secondly, document U.S. Pat. No. 5,116,910 does not reveal that the polymers it uses can be used in a combination with mineral fillers in a thermoplastic material, with a view to improving further this impact resistance, which is also one of the main objects of the present invention. Finally, this document does not reveal the particular grafting of the polyalkylene oxide function on to a monomer having an ethylenic unsaturation with a view to obtaining copolymers of the comb type. Moreover, document U.S. Pat. No. 5,116,910 does not reveal that the polymers it describes can be used with mineral matter in acrylic resins where they can be incorporated.

Document JP 06 073 263 seeks to obtain styrenic resins having satisfactory anti-static and impact resistance properties. The proposed solution consists in introducing into the said styrenic resin the combination of an alkaline metal salt and a vinylic polymer having at least one function chosen from among the carbonyl, epoxide or polyalkylene oxide functions, of molecular weight of between 300 and 2,000; the vinylic function may notably be provided by an acrylic and/or methacrylic monomer. However, this document in no way reveals or suggests the use of a mineral or carbonated filler in the presence of this polymer. However—and this is one of the essential characteristics of the present invention—the comb polymers which are used will exacerbate the impact resistance of the thermoplastic resin in the presence of a mineral or carbonated filler: in the present invention, it is the joint presence of the polymers described in the present invention and of these mineral and carbonated fillers which give, in a surprising manner, an improved impact resistance, whilst maintaining the rigidity of the resin.

Finally, the goal of document JP 04 063 818 is to improve the impact resistance of particular poly(phenylene sulphide)-based and polycarbonate-based resins. The solution consists in introducing a methacrylic polymer having a polyalkylene oxide function. As previously, nothing in this document invites the skilled man in the art to use a mineral or carbonated filler in combination with such polymers. And it is indeed the joint presence of such a filler and a particular comb polymer which gives, in the present invention, surprising results in terms of improvement of impact resistance and maintenance of rigidity.

Finally, the Applicant is keen to stress document US 2002/058 752, relating to the improvement of impact resistance in a thermoplastic resin such as PVC, and possibly in the presence of a mineral filler such as calcium carbonate.

This document thus concerns the problem of reinforcing thermoplastic materials, notably the reinforcement of their impact resistance. As such, it proposes a solution different to the core-shell type impact modifiers, which lies in the use of comb polymers mixed with the thermoplastic material, the said mixture then being heated, extruded and cooled. The comb polymers used to this effect do not contain any lactone monomer but are produced from a macromonomer of the methacrylic alkyl ester type. These polymers can be used in thermoplastic compositions containing notably PVC and calcium carbonate (see table 7), where they improve impact resistance, both compared to the same composition without the said polymer (as indicated in claim 1), and compared to the same composition containing, in the place of the said polymer, an impact modifying additive of the core-shell (see table 8). It is therefore very clear that the function of the said polymers is that of an impact modifier, which the skilled man in the art will substitute for the other organic impact modifiers of the prior art: the possibility of using them in combination with the latter is in no way revealed or even suggested. Furthermore, document US 2002/058 752 in no way teaches the particular grafting of the glycol polyalkylene oxide function on to a monomer having an ethylenic unsaturation, which is one of the essential objects of the present invention.

The second part of the state of the technique concerns documents revealing the use of comb-type polymers having an ethylenic unsaturation on to which is grafted a polyalkylene oxide function, but in very different technical fields, and with a view to resolving completely different problems.

Thus, the Applicant can cite document EP 0 610 534, which teaches the preparation of polymers obtained by copolymerisation of an isocyanate monomer and aprotic monomers, followed by functionalisation by means of monoalkylated amines or ethers of glycol polyalkylenes. Such agents are particularly effective for the grinding of organic pigments.

Similarly, they indicate that document WO 00/077 058 describes polymers based on an unsaturated derivative of a mono- or dicarboxylic acid, on an unsaturated derivative of glycol polyalkylene, on an unsaturated polysiloxane compound or on an unsaturated ester. These copolymers are used as dispersing agents in aqueous suspensions of mineral fillers, notably in the cements sector.

Finally they are aware of document WO 01/096 007, which describes an ionic, water-soluble copolymer having a glycol polyalkylene alkoxy or hydroxy function, the role of which is to disperse and/or assist grinding of pigments and/or mineral fillers. The said copolymer enables aqueous suspensions of the said refined materials to be obtained, with a dry matter concentration which may be high, with a low Brookfield™ viscosity which is stable over time, having the property of presenting a pigment surface the ionic filler of which, determined by titration, is low: this is therefore a technical problem which is very different from the one which the present invention seeks to resolve. The said aqueous suspensions of pigments and/or mineral fillers are then used in the manufacture of papers, or plastics such as PVC. As such, and as demonstrates notably the sole example relating to plastic (example 7), the said copolymer is not used as a direct additive in the plastic formulation. The general teaching of this document is moreover that such copolymers are used to disperse and/or grind mineral matters: this is a function completely different to that described in the present Application. Finally, this document in no way concerns the problem of increasing the impact resistance of thermoplastic resins, additionally, whilst maintaining their rigidity.

They are also familiar with document WO 2004/041 883, which teaches the use of a water-soluble copolymer, preferably weakly ionic and water-soluble, having at least one glycol polyalkylene alkoxy or hydroxy function grafted on to at least one ethylenic unsaturated monomer, as an agent improving the brilliance of the final product such as a sheet of paper or a plastic.

It would appear through a reading of this document that the said copolymer can be used in a process for dispersion (example 3) or for grinding (examples 1, 2, 6) or for manufacture (example 4) of mineral fillers in water, and that it is the resulting dispersion or suspension which gives the final product (paint or coated sheet of paper in examples 1, 2, 3, 4, 6 and 7) an improved brilliance. The said copolymer can also be used as a direct additive, but in a wet medium, in the case of the formulation of a paper coating colour, the said colour subsequently providing an improved brilliance to the coated sheet of paper (example 5). The technical problem resolved by this document is thus very different from the one forming the subject of the present Application.

Finally the Applicant is also familiar with document WO 2004/044 022, which describes the use of a water-soluble copolymer having at least one glycol polyalkylene alkoxy or hydroxy function grafted on to at least one ethylenic unsaturated monomer, as an agent improving the activation of optical brightening in the paper, textile, detergent and paint fields. It should be noted that this document never mentions the use of the said copolymers in plastics. Furthermore, activation of optical brightening is a property far removed from those forming the subject of the present Application.

Consequently, without anything teaching it or suggesting it in the state of the technique, the Applicant has developed a process for manufacturing thermoplastics which offers, in a surprising manner, an excellent compromise between impact resistance and rigidity of thermoplastic resins, since it gives the man skilled in the art advantages:
both in the case of the use of an organic impact modifier, in which case it enables a positive synergy to be achieved between the said modifier and the mineral or carbonated filler: possibility of reducing the quantity of impact modifier and of obtaining the same impact resistance and rigidity performance specifications, or maintenance of this quantity but increase of impact resistance and maintenance of rigidity;

and without an organic impact modifier: the impact resistance performance properties initially provided by the mineral or carbonated filler are "doped" by the present invention, without however degrading the rigidity of the resin.

It is thus a process for manufacturing thermoplastic material, containing:
(a) at least one thermoplastic resin,
(b) at least one mineral or carbonated filler,
(c) possibly at least one other additive chosen from among a thermal stabiliser and/or a UV stabiliser and/or a lubricant and/or a rheology modifier and/or an organic impact modifier, and characterised in that at least one comb polymer, containing at least one polyalkylene oxide function grafted on to a least one ethylenic unsaturated monomer, is introduced into the above-mentioned composition.

The process according to the invention is also characterised in that the said polymer is introduced:
1. in the form of dry powder, resulting from the stages of:
   grinding and/or dispersion in a wet medium of the mineral or carbonated filler in the presence of the said polymer, and possibly in the presence of at least one other grinding agent using a wet method and/or at least one other dispersant,
   drying of the dispersion and/or of the aqueous suspension of mineral or carbonated matter obtained, with possible introduction of the said polymer, treatment followed by possible classification of the powder obtained
2. and/or in the form of dry powder, resulting from the stages of:
   dry grinding of the mineral or carbonated filler in the presence of the said polymer, and possibly in the presence of at least one other dry grinding agent,
   treatment and possible classification of the powder obtained,
3. and/or in the form of dry powder, resulting from the stages of:
   introduction of the said polymer into a dispersion and/or into an aqueous suspension containing the mineral or carbonated filler,
   drying of the dispersion and/or of the aqueous suspension of mineral or carbonated matter obtained, with possible introduction of the said polymer, treatment followed by possible classification of the powder obtained,
4. and/or in the form of dry powder mixed with the other constituents a), b) and c),
5. and/or in the form of dry powder, resulting from the stages of:
   introduction of the said polymer into a suspension and/or an emulsion of at least one additive chosen from among a thermal stabiliser and/or a UV stabiliser and/or a lubricant and/or a rheology modifier and/or an organic impact modifier,
   drying of the suspension and/or of the emulsion obtained in the possible presence of the said polymer, followed possibly by classification of the powder obtained, The Applicant is keen to indicate that the said comb polymer, when it is used according to one of the 5 methods described above—except for the method referenced as 4—can be in the state of dry powder and/or in the liquid state, i.e. in the form of an emulsion or an aqueous suspension. Tangibly, it is in the form of dry powder and/or in liquid form that the said polymer is added during dry grinding or in a wet medium (methods 1 and 2), and/or in an aqueous suspension containing the mineral or carbonated filler (method 3), and/or in an emulsion or a suspension containing at least one additive chosen from among a thermal stabiliser and/or a UV stabiliser and/or a lubricant and/or a rheology modifier and/or an organic impact modifier (method 5).

The process according to the invention is also characterised in that the thermoplastic resin is chosen from among the halogenated resins, such as notably PVC, post-chlorinated vinyl polychloride (PVCC), vinylidene polyfluoride (PVDF), or chosen from among the styrenic resins, such as notably the styrene-butadiene copolymers with a high styrene rate (HIPS), block copolymers of the Kraton™ type, resins of the styrene-acrylonitrile type, acrylate-butadiene-styrene resins, methylmethacrylate styrene copolymers, or chosen from among the acrylic resins, such as notably methyl polymethacrylate, or chosen from among the polyolefines, such as notably the polyethylenes or polypropylenes, or chosen from among the polycarbonate resins, or chosen from among the unsaturated polyester resins, such as notably terephthalate polyethylene and the terephthalate polybutylenes, or chosen from among the polyurethane resins or chosen from among the polyamide resins, or a mixture of these resins, and preferentially in that the thermoplastic resin is chosen from among the halogenated resins, such as notably PVC, post-chlorinated vinyl polychloride (PVCC), vinylidene polyfluoride (PVDF), or the acrylic resins, such as notably methyl polymethacrylate, or chosen from among the polycarbonate resins, or chosen from among the unsaturated polyester resins, such as notably terephthalate polyethylene and the terephthalate polybutylenes, and very preferentially in that this thermoplastic resin is PVC.

The process according to the invention is also characterised in that the mineral or carbonated filler is chosen from among natural or synthetic calcium carbonate, the dolomites, kaolin, talc, gypsum, titanium oxide, satin white or aluminium trihydroxide, mica, carbon black and a mixture of these fillers, such as talc-calcium carbonate mixtures, calcium carbonate-kaolin mixtures or mixtures of calcium carbonate with aluminium trihydroxide, or again mixtures with synthetic or natural fibres or again mineral co-structures such as talc-calcium carbonate or talc-titanium dioxide co-structures.

The mineral or carbonated filler is preferentially a mineral filler chosen from among natural or synthetic calcium carbonate, talc and mixtures of these fillers.

The mineral or carbonated filler is very preferentially a mineral filler which is a natural or synthetic calcium carbonate or their mixtures.

The mineral or carbonated filler is extremely preferentially a mineral filler which is a natural or synthetic calcium carbonate chosen from among marble, calcite, chalk or their mixtures.

The process according to the invention is also characterised in that the organic impact modifier is chosen from among the impact additives of the core-shell type, or the chlorinated polyolefines, or the styrene-butadiene rubbers (SBR), styrene-butadiene-styrenes (SBS), the vinyl polyacetates, and their mixtures, and preferentially in that the organic impact modifier is chosen from among the impact additives of the core-shell type or the chlorinated polyolefines and their mixtures, and very preferentially in that the organic impact modifier is chosen from among the impact additives of the core-shell type of the acrylic, styrenic, butadienic type, and in an extremely preferential manner in that the said impact additive of the core-shell type has a butyl acrylate-based elastomer core, or has a polybutadiene-based elastomer core and a polymethacrylate-based or polystyrene-based shell.

The process according to the invention is also characterised in that uses:
- (a) between 0.1 and 99% by dry weight of at least one thermoplastic resin, compared to the total weight of the thermoplastic formulation,
- (b) between 0.1 and 90% by dry weight of at least one mineral or carbonated filler, compared to the total weight of the thermoplastic formulation,
- (c) between 0 and 20%, and preferentially between 5 and 20%, by dry weight of a thermal stabiliser and/or a UV stabiliser and/or a lubricant and/or a rheology modifier and/or an organic impact modifier, compared to the total weight of the thermoplastic formulation,
- (d) between 0.01 and 5%, and preferentially between 0.1 and 3%, by dry weight of a comb polymer consisting of at least one ethylenic unsaturation monomer on to which is grafted at least one polyalkylene oxide function, compared to the dry weight of mineral or carbonated filler.

The Applicant indicates that the skilled man in the art may add, to the process according to the invention, other additives such as notably processing aids, lubricants or rheology modifying additives, without this being an exhaustive list.

The process according to the invention is also characterised in that the comb polymers contain at least one monomer of formula (I):

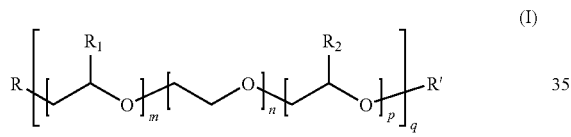

where:
- m and p represent a number of alkylene oxide units of less than or equal to 150,
- n represents a number of ethylene oxide units of less than or equal to 150,
- q represents an integer at least equal to 1 and such that $5 \leq (m+n+p)q \leq 150$,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures.

The process according to the invention is also characterised in that the comb polymers consist of:
- a) at least one anionic monomer with a carboxylic or dicarboxylic or phosphoric or phosphonic or sulphonic function, or their mixtures,
- b) at least one non-ionic monomer, where the non-ionic monomer consists of at least one monomer of formula (I):

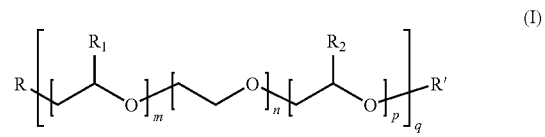

where:
- m and p represent a number of alkylene oxide units of less than or equal to 150,
- n represents a number of ethylene oxide units of less than or equal to 150,
- q represents an integer at least equal to 1 and such that $5 \leq (m+n+p)q \leq 150$, and preferentially such that $15 \leq (m+n+p)q \leq 120$
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures, and preferentially represents a hydrocarbonated radical having 1 to 12 carbon atoms, and very preferentially a hydrocarbonated radical having 1 to 4 carbon atoms.

or a mixture of several monomers of formula (I),
- c) possibly at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino) ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate or organosililate monomer, or a mixture of several of these monomers,
- d) possibly at least one monomer having at least two ethylenic unsaturations called in the remainder of the Application a crosslinking monomer, The process according to the invention is also characterised in that the said comb polymer consists:
a) of at least one anionic monomer with ethylenic unsaturation and with a monocarboxylic function chosen from among the ethylenic unsaturation monomers and with a monocarboxylic function such as acrylic or methacrylic acid, or again the diacid hemiesters such as the $C_1$ to $C_4$ monoesters of maleic or itaconic acids, or their mixtures, or chosen from among the monomers with ethylenic unsaturation and with a dicarboxylic function such as crotonic, isocrotonic, cinnamic, itaconic, maleic acid, or again the anhydrides of carboxylic acids, such as maleic anhydride, or chosen from among the monomers with ethylenic unsaturation and with a sulphonic function such as acrylamido-methyl-propane-sulphonic acid, sodium methallylsulphonate, vinyl sulphonic acid and styrene sulphonic acid, or again chosen from among the monomers with ethylenic unsaturation and with a phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or their mixtures, or their mixtures,
b) of a least one monomer with a non-ionic ethylenic unsaturation of formula (I):

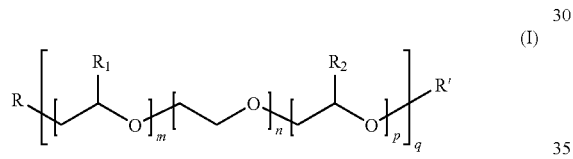

where:
m and p represent a number of alkylene oxide units of less than or equal to 150,
n represents a number of ethylene oxide units of less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures, and preferentially represents a hydrocarbonated radical having 1 to 12 carbon atoms, and very preferentially a hydrocarbonated radical having 1 to 4 carbon atoms.

or a mixture of several monomers of formula (I),
c) possibly at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino) ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate monomer, or indeed at least one organosililate monomer, preferentially chosen from among the molecules of formulae (IIa) or (IIb):

with formula (IIa)

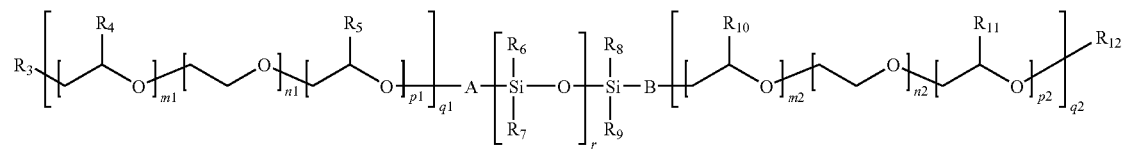

where:
$m_1$, $p_1$, $m_2$ and $p_2$ represent a number of alkylene oxide units of less than or equal to 150,
$n_1$ and $n_2$ represent a number of ethylene oxide units of less than or equal to 150,
$q_1$ and $q_2$ represent a whole number at least equal to 1 and such that $0 \leq (m_1+n_1+p_1)q_1 \leq 150$ and $0 \leq (m_2+n_2+p_2)q_2 \leq 150$,
r represents a number such that $1 \leq r \leq 200$,
$R_3$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, $R_4$, $R_5$, $R_{10}$ and $R_{11}$ represent hydrogen or the methyl or ethyl radical, $R_6$, $R_7$, $R_8$ and $R_9$ represent linear or branched alkyl or aryl, or alkylaryl or arylalkyl groupings, having 1 to 20 carbon atoms, or their mixtures, $R_{12}$ represents a hydrocarbonated radical having 1 to 40 carbon atoms, A and B are groupings which may be present, which then represent a hydrocarbonated radical having 1 to 4 carbon atoms, with formula (IIb)

$$R\text{-}A\text{-}Si(OB)_3$$

where:

R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, A is a grouping which may be present, which then represents a hydrocarbonated radical having 1 to 4 carbon atoms, B represents a hydrocarbonated radical having 1 to 4 carbon atoms, or the mixture of several of these monomers, d) and possibly at least one crosslinking monomer chosen, in a non-restrictive manner, from the group constituted by ethylene glycol dimethacrylate, trimethlolpropanetriacrylate, allyl acrylate, the allyl maleates, methylene-bis-acrylamide, methylene-bis-methacrylamide, tetrallyloxyethane, the triallylcyanurates, the allyl ethers obtained from polyols such as pentaerythritol, sorbitol, sucrose or others, or chosen from among the molecules of formula (III):

benzylurethane, allylurethane, or to the group of allylic or vinylic ethers, whether or not substituted, or again to the group of ethylenically unsaturated amides or imides, $R_{14}$, $R_{15}$, $R_{20}$ and $R_{21}$ represent hydrogen or the methyl or ethyl radical, $R_{16}$, $R_{17}$, $R_{18}$ and $R_{19}$ represent linear or branched alkyl or aryl, or alkylaryl or arylalkyl groupings, having 1 to 20 carbon atoms, or their mixtures, D and E are groupings which may be present, which then represent a hydrocarbonated radical having 1 to 4 carbon atoms, or the mixture of several of these monomers, The process according to the invention is also characterised in that the said comb polymer consists, expressed by weight:

a) between 2% and 95%, and more particularly between 5% and 90%, of at least one anionic monomer with ethylenic unsaturation and with a monocarboxylic function chosen from among the ethylenic unsaturation monomers and with a monocarboxylic function such as acrylic or methacrylic acid, or again the diacid hemiesters such as the $C_1$ to $C_4$ monoesters of maleic or itaconic acids, or their mixtures, or chosen from among the monomers with ethylenic unsaturation and with a dicarboxylic function such as crotonic, isocrotonic, cinnamic, itaconic, maleic acid, or again the anhydrides of carboxylic acids, such as maleic anhydride, or chosen from among the monomers with ethylenic unsaturation and with a sulphonic function such as acrylamido-methyl-propane-sulphonic acid, sodium methallylsulphonate, vinyl sulphonic acid and styrene sulphonic acid, or again chosen from among the monomers with ethylenic unsaturation and with a phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsatura-

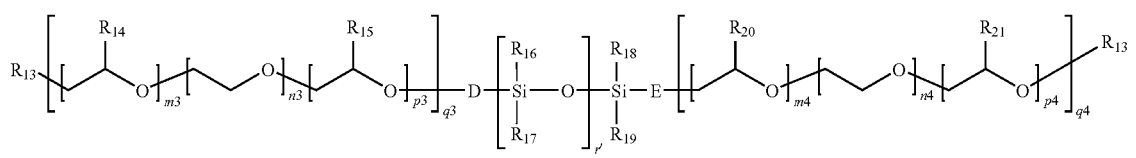

(III)

where:

$m_3$, $p_3$, $m_4$ and $p_4$ represent a number of alkylene oxide units of less than or equal to 150, $n_3$ and $n_4$ represent a number of ethylene oxide units of less than or equal to 150, $q_3$ and $q_4$ represent a whole number at least equal to 1 and such that $0 \leq (m_3+n_3+p_3)q_3 \leq 150$ and $0 \leq (m_4+n_4+p_4)q_4 \leq 150$, r' represents a number such that $1 \leq r' \leq 200$, $R_{13}$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyltion and with a phosphonic function such as vinyl phosphonic acid, or their mixtures, or their mixtures, b) between 2 and 95%, and yet more particularly between 5% and 90%, of a least one monomer with non-ionic ethylenic unsaturation of formula (I):

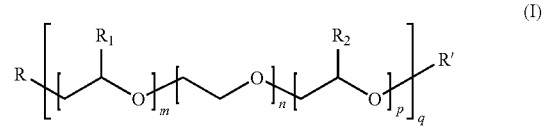

(I)

where:

m and p represent a number of alkylene oxide units of less than or equal to 150, n represents a number of ethylene oxide units of less than or equal to 150, q represents a whole number at least equal to 1 and such that $5 \leq (m+n+p)q \leq 150$, and preferentially such that $15 \leq (m+n+p)q \leq 120$, $R_1$ represents hydrogen or the methyl or ethyl radical, $R_2$ represents hydrogen or the methyl or ethyl radical, R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides;

R' represents hydrogen or a hydrocarbonated radical having 1 to 40-carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures, and preferentially represents a hydrocarbonated radical having 1 to 12 carbon atoms, and very preferentially a hydrocarbonated radical having 1 to 4 carbon atoms.

or a mixture of several monomers of formula (I), c) between 0% and 50% of at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride, dimethyl diallyl ammonium chloride or sulphate, [3-(methacrylamido)propyl]trimethyl ammonium chloride or sulphate, or again one organofluorate monomer, or indeed one organosililate monomer, preferentially chosen from among the molecules of formulae (IIa) or (IIb):

with formula (IIa)

where:
$m_1$, $p_1$, $m_2$ and $p_2$ represent a number of alkylene oxide units of less than or equal to 150, $n_1$ and $n_2$ represent a number of ethylene oxide units of less than or equal to 150, $q_1$ and $q_2$ represent a whole number at least equal to 1 and such that $0 \leq (m_1+n_1+p_1)q_1 \leq 150$ and $0 \leq (m_2+n_2+p_2)q_2 \leq 150$, r represents a number such that $1 \leq r \leq 200$, $R_3$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, $R_4$, $R_5$, $R_{10}$ and $R_{11}$ represent hydrogen or the methyl or ethyl radical, $R_6$, $R_7$, $R_8$ and $R_9$ represent linear or branched alkyl or aryl, or alkylaryl or arylalkyl groupings, having 1 to 20 carbon atoms, or their mixtures, $R_{12}$ represents a hydrocarbonated radical having 1 to 40 carbon atoms, A and B are groupings which may be present, which then represent a hydrocarbonated radical having 1 to 4 carbon atoms, with formula (IIb)

R-A-Si(OB)$_3$ where:
R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, A is a grouping which may be present, which then represents a hydrocarbonated radical having 1 to 4 carbon atoms, B represents a hydrocarbonated radical having 1 to 4 carbon atoms, or the mixture of several of these monomers, d) between 0% 0 and 3% of at least one crosslinking monomer chosen, in a non-restrictive manner, from the group constituted by ethylene glycol dimethacrylate, trimethlolpropanetriacrylate, allyl acrylate, the allyl maleates, methylene-bis-acrylamide, methylene-bis-methacrylamide, tetrallyloxyethane, the triallylcyanurates,

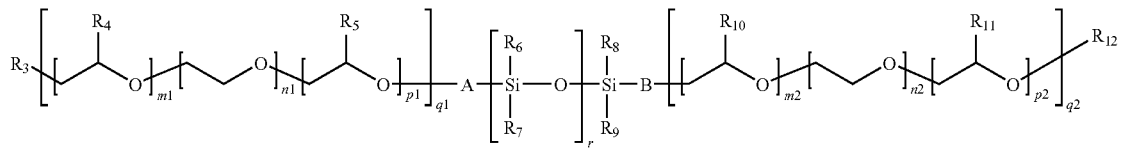

the allyl ethers obtained from polyols such as pentaerythritol, sorbitol, sucrose or others, or chosen from among the molecules of formula (III):

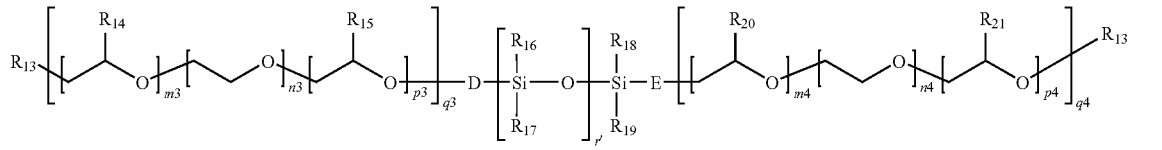

where:
- $m_3$, $p_3$, $m_4$ and $p_4$ represent a number of alkylene oxide units of less than or equal to 150,
- $n_3$ and $n_4$ represent a number of ethylene oxide units of less than or equal to 150,
- $q_3$ and $q_4$ represent a whole number at least equal to 1 and such that $0 \leq (m_3+n_3+p_3)q_3 \leq 150$ and $0 \leq (m_4+n_4+p_4)q_4 \leq 150$,
- $r'$ represents a number such that $1 \leq r' \leq 200$,
- $R_{13}$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- $R_{14}$, $R_{15}$, $R_{20}$ and $R_{21}$ represent hydrogen or the methyl or ethyl radical,
- $R_{16}$, $R_{17}$, $R_{18}$ and $R_{19}$ represent linear or branched alkyl or aryl, or alkylaryl or arylalkyl groupings, having 1 to 20 carbon atoms, or their mixtures,
- D and E are groupings which may be present, which then represent a hydrocarbonated radical having 1 to 4 carbon atoms, or the mixture of several of these monomers,
where the total proportions of the constituents a), b), c) and d) is equal to 100%.

The polymer used according to the invention is obtained by known processes of radical copolymerisation in solution, in a direct or reverse emulsion, in suspension or in precipitation in appropriate solvents, in the presence of catalytic systems and known transfer agents, or again by controlled radical polymerisation processes such as the method known as Reversible Addition Fragmentation Transfer (RAFT), the method known as Atom Transfer Radical Polymerization (ATRP), the method known as Nitroxide Mediated Polymerization (NMP) or again the method known as Cobaloxime Mediated Free Radical Polymerization.

This polymer obtained in the acid form, and possibly distilled, may also be partially or totally neutralised by one or more neutralisation agents having a monovalent neutralising function or a polyvalent neutralising function such as, for example, for the monovalent function of those chosen from the group constituted by the alkaline cations, in particular sodium, potassium, lithium, ammonium or the primary, secondary or tertiary aliphatic and/or cyclic amines, such as, for example, stearylamine, the ethanolamines (mono-, di-, tri-ethanolamine), mono- and diethylamine, cyclohexylamine, methylcyclohexylamine, amino methyl propanol, morpholine, or again, for the polyvalent function, those chosen from the group constituted by the alkaline earth divalent cations, in particular magnesium and calcium, or again zinc, and also by the trivalent cations, in particular aluminium, or again by certain cations of higher valency.

Each neutralisation agent then acts with neutralisation rates inherent to each valency function.

According to another variant, the polymer derived from the polymerisation reaction may also be, before or after the total or partial neutralisation reaction, treated and separated into several phases, according to static or dynamic processes known to the skilled man in the art, by one or more polar solvents belonging notably to the group constituted by water, methanol, ethanol, propanol, isopropanol, the butanols, acetone, tetrahydrofuran or their mixtures.

One of the phases then corresponds to the copolymer used according to the invention as an agent allowing the improvement of impact resistance in thermoplastic materials.

According to another variant, the said polymer may be dried.

Another object of the invention lies in the thermoplastic compositions obtained by the process according to the invention.

Another object of the invention lies in thermoplastic compositions containing:
(a) at least one thermoplastic resin,
(b) at least one mineral or carbonated filler,
(c) possibly at least one thermal stabiliser and/or one UV stabiliser and/or one lubricant and/or one rheology modifier and/or one organic impact modifier,
(d) at least one comb polymer, containing at least one polyalkylene oxide function grafted on to at least one ethylenic unsaturated monomer.

The thermoplastic compositions according to the invention are also characterised in that the thermoplastic resin is chosen from among the halogenated resins, such as notably PVC, post-chlorinated vinyl polychloride (PVCC), vinylidene polyfluoride (PVDF), or chosen from among the styrenic resins, such as notably the styrene-butadiene copolymers with a high styrene rate (HIPS), block copolymers of the Kraton™ type, resins of the styrene-acrylonitrile type, acrylate-butadiene-styrene resins, methylmethacrylate styrene copolymers, or chosen from among the acrylic resins, such as notably methyl polymethacrylate, or chosen from among the polyolefines, such as notably the polyethylenes or polypropylenes, or chosen from among the polycarbonate resins, or chosen from among the unsaturated polyester resins, such as notably terephthalate polyethylene and the terephthalate polybutylenes, or chosen from among the polyurethane resins or chosen from among the polyamide resins, or a mixture of these resins, and preferentially in that the thermoplastic resin is chosen from among the halogenated resins, such as notably PVC, post-chlorinated vinyl polychloride (PVCC), vinylidene polyfluoride (PVDF), or the acrylic resins, such as notably methyl polymethacrylate, or chosen from among the polycarbonate resins, or chosen from among the unsaturated polyester resins, such as notably terephthalate polyethylene and the terephthalate polybutylenes, and very preferentially in that this thermoplastic resin is PVC.

The thermoplastic compositions according to the invention are also characterised in that the mineral or carbonated filler is chosen from among natural or synthetic calcium carbonate, the dolomites, kaolin, talc, gypsum, titanium oxide, satin white or aluminium trihydroxide, mica, carbon black and a mixture of these fillers, such as talc-calcium carbonate mixtures, calcium carbonate-kaolin mixtures or mixtures of calcium carbonate with aluminium trihydroxide, or again mixtures with synthetic or natural fibres or again mineral co-structures such as talc-calcium carbonate or talc-titanium dioxide co-structures.

The mineral or carbonated filler is preferentially a mineral filler chosen from among natural or synthetic calcium carbonate, talc and mixtures of these fillers.

The mineral or carbonated filler is very preferentially a mineral filler which is a natural or synthetic calcium carbonate or their mixtures.

The mineral or carbonated filler is extremely preferentially a mineral filler which is a natural or synthetic calcium carbonate chosen from among marble, calcite, chalk or their mixtures.

The thermoplastic compositions according to the invention are also characterised in that the organic impact modifier is chosen from among the impact additives of the core-shell type, or the chlorinated polyolefines, or the styrene-butadiene rubbers (SBR), styrene-butadiene-styrenes (SBS), the vinyl polyacetates, and their mixtures, and preferentially in that the organic impact modifier is chosen from among the impact additives of the core-shell type or the chlorinated polyolefines and their mixtures, and very preferentially in that the organic impact modifier is chosen from among the impact additives of the core-shell type of the acrylic, styrenic, butadienic type, and in an extremely preferential manner in that the said impact additive of the core-shell type has a butyl acrylate-based elastomer core, or has a polybutadiene-based elastomer core and a polymethacrylate-based or polystyrene-based shell.

The Applicant indicates that the skilled man in the art may add, into the thermoplastic compositions according to the invention, other additives.

The thermoplastic compositions according to the invention are also characterised in that they contain:
(a) between 0.1 and 99% by dry weight of at least one thermoplastic resin, compared to the total weight of the thermoplastic formulation,
(b) between 0.1 and 90% by dry weight of at least one mineral or carbonated filler, compared to the total weight of the thermoplastic formulation,
(c) between 0 and 20%, and preferentially between 5 and 20%, by dry weight of a thermal stabiliser and/or a UV stabiliser and/or a lubricant and/or a rheology modifier and/or an organic impact modifier, compared to the total weight of the thermoplastic formulation,
(d) between 0.01 and 5%, and preferentially between 0.1 and 3%, by dry weight of a comb polymer consisting of at least one ethylenic unsaturation monomer on to which is grafted at least one polyalkylene oxide function, compared to the dry weight of mineral or carbonated filler.

The thermoplastic compositions according to the invention are also characterised in that the comb polymers contain at least one monomer of formula (I):

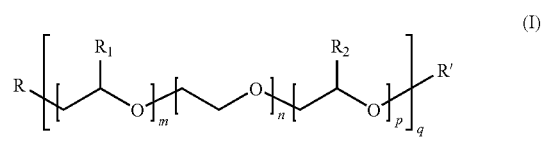

where:
m and p represent a number of alkylene oxide units of less than or equal to 150,
n represents a number of ethylene oxide units of less than or equal to 150,
q represents an integer at least equal to 1 and such that $5 \leq (m+n+p)q \leq 150$,
$R_1$ represents hydrogen or the methyl or ethyl radical,
$R_2$ represents hydrogen or the methyl or ethyl radical,
R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures.

The thermoplastic compositions according to the invention are also characterised in that the comb polymers consist:
(a) of at least one anionic monomer with a carboxylic or dicarboxylic or phosphoric or phosphonic or sulphonic function, or their mixtures,
(b) of at least one non-ionic monomer, where the non-ionic monomer consists of at least one monomer of formula (I):

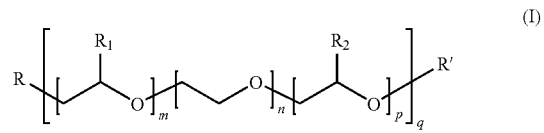

where:
m and p represent a number of alkylene oxide units of less than or equal to 150,
n represents a number of ethylene oxide units of less than or equal to 150,
q represents an integer at least equal to 1 and such that $5 \leq (m+n+p)q \leq 150$, and preferentially such that $15 \leq (m+n+p)q \leq 120$
$R_1$ represents hydrogen or the methyl or ethyl radical,
$R_2$ represents hydrogen or the methyl or ethyl radical,
R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures, and preferentially represents a hydrocarbonated radical having 1 to 12 carbon atoms, and very preferentially a hydrocarbonated radical having 1 to 4 carbon atoms.

or a mixture of several monomers of formula (I), (c) possibly at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate or organosililate monomer, or a mixture of several of these monomers, (d) possibly at least one monomer having at least two ethylenic unsaturations called in the remainder of the Application a grafting monomer, The thermoplastic compositions according to the invention are also characterised in that the said comb polymer consists:

a) of at least one anionic monomer with ethylenic unsaturation and with a monocarboxylic function chosen from among the ethylenic unsaturation monomers and with a monocarboxylic function such as acrylic or methacrylic acid, or again the diacid hemiesters such as the $C_1$ to $C_4$ monoesters of maleic or itaconic acids, or their mixtures, or chosen from among the monomers with ethylenic unsaturation and with a dicarboxylic function such as crotonic, isocrotonic, cinnamic, itaconic, maleic acid, or again the anhydrides of carboxylic acids, such as maleic anhydride, or chosen from among the monomers with ethylenic unsaturation and with a sulphonic function such as acrylamidomethyl-propane-sulphonic acid, sodium methallylsulphonate, vinyl sulphonic acid and styrene sulphonic acid, or again chosen from among the monomers with ethylenic unsaturation and with a phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or their mixtures, or their mixtures, b) of a least one monomer with a non-ionic ethylenic unsaturation of formula (I):

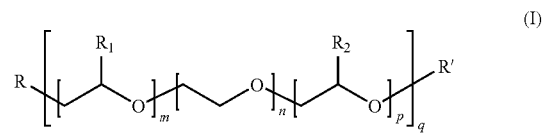

where:
m and p represent a number of alkylene oxide units of less than or equal to 150,
n represents a number of ethylene oxide units of less than or equal to 150,
q represents a whole number at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures, and preferentially represents a hydrocarbonated radical having 1 to 12 carbon atoms, and very preferentially a hydrocarbonated radical having 1 to 4 carbon atoms.

or a mixture of several monomers of formula (I), c) possibly at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate monomer, or indeed at least one organosililate monomer, preferentially chosen from among the molecules of formulae (IIa) or (IIb):

with formula (IIa)

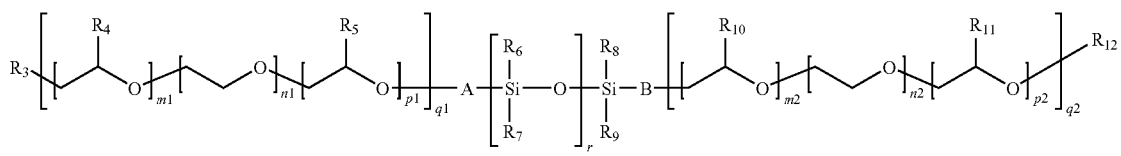

where:
- $m_1$, $p_1$, $m_2$ and $p_2$ represent a number of alkylene oxide units of less than or equal to 150,
- $n_1$ and $n_2$ represent a number of ethylene oxide units of less than or equal to 150,
- $q_1$ and $q_2$ represent a whole number at least equal to 1 and such that $0 \leq (m_1+n_1+p_1)q_1 \leq 150$ and $0 \leq (m_2+n_2+p_2)q_2 \leq 150$,
- r represents a number such that $1 \leq r \leq 200$,
- $R_3$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- $R_4$, $R_5$, $R_{10}$ and $R_{11}$ represent hydrogen or the methyl or ethyl radical,
- $R_6$, $R_7$, $R_8$ and $R_9$ represent linear or branched alkyl or aryl, or alkylaryl or arylalkyl groupings, having 1 to 20 carbon atoms, or their mixtures,
- $R_{12}$ represents a hydrocarbonated radical having 1 to 40 carbon atoms,
- A and B are groupings which may be present, which then represent a hydrocarbonated radical having 1 to 4 carbon atoms, with formula (IIb)

$$R\text{-}A\text{-}Si(OB)_3$$

where:
- R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- A is a grouping which may be present, which then represents a hydrocarbonated radical having 1 to 4 carbon atoms,
- B represents a hydrocarbonated radical having 1 to 4 carbon atoms, or the mixture of several of these monomers, d) and possibly at least one crosslinking monomer chosen, in a non-restrictive manner, from the group constituted by ethylene glycol dimethacrylate, trimethlolpropanetriacrylate, allyl acrylate, the allyl maleates, methylene-bis-acrylamide, methylene-bis-methacrylamide, tetrallyloxyethane, the triallylcyanurates, the allyl ethers obtained from polyols such as pentaerythritol, sorbitol, sucrose or others, or chosen from among the molecules of formula (III):

where:
- $m_3$, $p_3$, $m_4$ and $p_4$ represent a number of alkylene oxide units of less than or equal to 150,
- $n_3$ and $n_4$ represent a number of ethylene oxide units of less than or equal to 150,
- $q_3$ and $q_4$ represent a whole number at least equal to 1 and such that $0 \leq (m_3+n_3+p_3)q_3 \leq 150$ and $0 \leq (m_4+n_4+p_4)q_4 \leq 150$,
- r' represents a number such that $1 \leq r' \leq 200$,
- $R_{13}$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- $R_{14}$, $R_{15}$, $R_{20}$ and $R_{21}$ represent hydrogen or the methyl or ethyl radical,
- $R_{16}$, $R_{17}$, $R_{18}$ and $R_{19}$ represent linear or branched alkyl or aryl, or alkylaryl or arylalkyl groupings, having 1 to 20 carbon atoms, or their mixtures,
- D and E are groupings which may be present, which then represent a hydrocarbonated radical having 1 to 4 carbon atoms, or the mixture of several of these monomers, The thermoplastic compositions according to the invention are also characterised in that the said comb polymer consists, expressed by weight:

a) between 2% and 95%, and more particularly between 5% and 90%, of at least one anionic monomer with ethylenic unsaturation and with a monocarboxylic function chosen from among the ethylenic unsaturation monomers and with a monocarboxylic function such as acrylic or methacrylic acid, or again the diacid hemiesters such as the $C_1$ to $C_4$ monoesters of maleic or itaconic acids, or their mixtures, or chosen from among the monomers with ethylenic unsaturation and with a dicarboxylic function such as crotonic, isocrotonic, cinnamic, itaconic, maleic acid, or again the anhydrides of carboxylic acids, such as maleic anhydride, or chosen from among the monomers with ethylenic unsaturation and with a sulphonic function such as acrylamidomethyl-propane-sulphonic acid, sodium methallylsulphonate, vinyl sulphonic acid and styrene sulphonic acid, or again chosen from among the monomers with ethylenic unsaturation and with a phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates, or again chosen from among the monomers with ethylenic unsaturation and with a phosphonic function such as vinyl phosphonic acid, or their mixtures, or their mixtures, (III)

$$R_{13}\left[\begin{array}{c}R_{14}\\|\\\phantom{O}\end{array}O\right]_{m_3}\left[O\right]_{n_3}\left[\begin{array}{c}R_{15}\\|\\\phantom{O}\end{array}O\right]_{p_3}\Bigg]_{q_3}\text{-}D\text{-}\left[\begin{array}{c}R_{16}\\|\\Si\\|\\R_{17}\end{array}\text{-}O\right]_{r'}\text{-}\begin{array}{c}R_{18}\\|\\Si\\|\\R_{19}\end{array}\text{-}E\left[\begin{array}{c}R_{20}\\|\\\phantom{O}\end{array}O\right]_{m_4}\left[O\right]_{n_4}\left[\begin{array}{c}R_{21}\\|\\\phantom{O}\end{array}O\right]_{p_4}\Bigg]_{q_4}R_{13}$$

b) between 2 and 95%, and yet more particularly between 5% and 90%, of a least one monomer with non-ionic ethylenic unsaturation of formula (I):

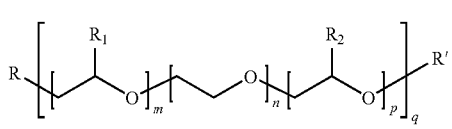

(I)

where:
- m and p represent a number of alkylene oxide units of less than or equal to 150,
- n represents a number of ethylene oxide units of less than or equal to 150,
- q represents a whole number at least equal to 1 and such that $5 \leq (n+n+p)q \leq 150$, and preferentially such that $15 \leq (m+n+p)q \leq 120$,
- $R_1$ represents hydrogen or the methyl or ethyl-radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 40 carbon atoms, or an ionic or ionisable grouping such as a phosphate, a phosphonate, a sulphate, a sulphonate, a carboxylic, or indeed a primary, secondary or tertiary amine, or a quaternary ammonium, or indeed their mixtures, and preferentially represents a hydrocarbonated radical having 1 to 12 carbon atoms, and very preferentially a hydrocarbonated radical having 1 to 4 carbon atoms.

or a mixture of several monomers of formula (I), c) between 0% and 50% of at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino) ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride, dimethyl diallyl ammonium chloride or sulphate, [3-(methacrylamido)propyl]trimethyl ammonium chloride or sulphate, or again one organofluorate monomer, or indeed one organosililate monomer, preferentially chosen from among the molecules of formulae (IIa) or (IIb):

with formula (IIa)

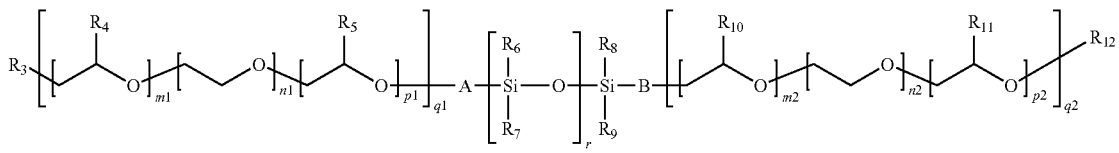

where:
- $m_1$, $p_1$, $m_2$ and $p_2$ represent a number of alkylene oxide units of less than or equal to 150,
- $n_1$ and $n_2$ represent a number of ethylene oxide units of less than or equal to 150,
- $q_1$ and $q_2$ represent a whole number at least equal to 1 and such that $0 \leq (m_1+n_1+p_1)q_1 \leq 150$ and $0 \leq (m_2+n_2+p_2)q_2 \leq 150$,
- r represents a number such that $1 \leq r \leq 200$,
- $R_3$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to, the group of ethylenically unsaturated amides or imides,
- $R_4$, $R_5$, $R_{10}$ and $R_{11}$ represent hydrogen or the methyl or ethyl radical,
- $R_6$, $R_7$, $R_8$ and $R_9$ represent linear or branched alkyl or aryl, or alkylaryl or arylalkyl groupings, having 1 to 20 carbon atoms, or their mixtures,
- $R_{12}$ represents a hydrocarbonated radical having 1 to 40 carbon atoms,
- A and B are groupings which may be present, which then represent a hydrocarbonated radical having 1 to 4 carbon atoms, with formula (IIb)

R-A-Si(OB)$_3$ where:
- R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- A is a grouping which may be present, which then represents a hydrocarbonated radical having 1 to 4 carbon atoms,
- B represents a hydrocarbonated radical having 1 to 4 carbon atoms, or the mixture of several of these monomers, d) between 0% and 3% of at least one crosslinking monomer chosen, in a non-restrictive manner, from the group constituted by ethylene glycol dimethacrylate, trimethlolpropanetriacrylate, allyl acrylate, the allyl maleates, methylene-bis-acrylamide, methylene-bis-methacryl amide, tetrallyloxyethane, the triallylcyanurates, the allyl ethers obtained from polyols such as pentaerythritol, sorbitol, sucrose or others, or chosen from among the molecules of formula (III):

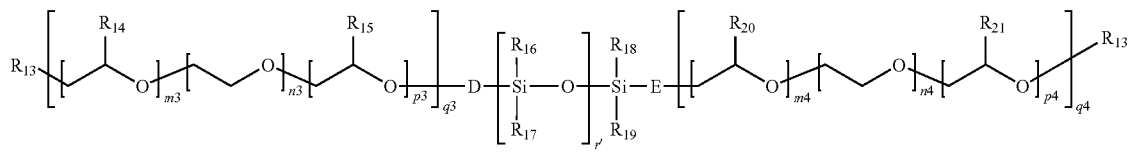

(III)

where:
- $m_3$, $p_3$, $m_4$ and $p_4$ represent a number of alkylene oxide units of less than or equal to 150,
- $n_3$ and $n_4$ represent a number of ethylene oxide units of less than or equal to 150,
- $q_3$ and $q_4$ represent a whole number at least equal to 1 and such that $0 \leq (m_3+n_3+p_3)q_3 \leq 150$ and $0 \leq (m_4+n_4+p_4)q_4 \leq 150$,
- r' represents a number such that $1 \leq r' \leq 200$,
- $R_{13}$ represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane. α-α' dimethyl-isopropenyl-benzylurethane, allylurethane, or to the group of allylic or vinylic ethers, whether or not substituted, or again to the group of ethylenically unsaturated amides or imides,
- $R_{14}$, $R_{15}$, $R_{20}$ and $R_{21}$ represent hydrogen or the methyl or ethyl radical,
- $R_{16}$, $R_{17}$, $R_{18}$ and $R_{19}$ represent linear or branched alkyl or aryl, or alkylaryl or arylalkyl groupings, having 1 to 20 carbon atoms, or their mixtures,
- D and E are groupings which may be present, which then represent a hydrocarbonated radical having 1 to 4 carbon atoms, or the mixture of several of these monomers,
where the total proportions of the constituents a), b), c) and d) is equal to 100%.

The polymer used according to the invention is obtained by known processes of radical copolymerisation in solution, in a direct or reverse emulsion, in suspension or in precipitation in appropriate solvents, in the presence of catalytic systems and known transfer agents, or again by controlled radical polymerisation processes such as the method known as Reversible Addition Fragmentation Transfer (RAFT), the method known as Atom Transfer Radical Polymerization (ATRP), the method known as Nitroxide Mediated Polymerization (NMP) or again the method known as Cobaloxime Mediated Free Radical Polymerization.

This polymer obtained in the acid form, and possibly distilled, may also be partially or totally neutralised by one or more neutralisation agents having a monovalent neutralising function or a polyvalent neutralising function such as, for example, for the monovalent function of those chosen from the group constituted by the alkaline cations, in particular sodium, potassium, lithium, ammonium or the primary, secondary or tertiary aliphatic and/or cyclic amines, such as, for example, stearylamine, the ethanolamines (mono-, di-, triethanolamine), mono- and diethylamine, cyclohexylamine, methylcyclohexylamine, amino methyl propanol, morpholine, or again, for the polyvalent function, those chosen from the group constituted by the alkaline earth divalent cations, in particular magnesium and calcium, or again zinc, and also by the trivalent cations, in particular aluminium, or again by certain cations of higher valency.

Each neutralisation agent then acts with neutralisation rates inherent to each valency function.

According to another variant, the polymer derived from the polymerisation reaction may also be, before or after the total or partial neutralisation reaction, treated and separated into several phases, according to static or dynamic processes known to the skilled man in the art, by one or more polar solvents belonging notably to the group constituted by water, methanol, ethanol, propanol, isopropanol, the butanols, acetone, tetrahydrofuran or their mixtures.

One of the phases then corresponds to the polymer used according to the invention.

According to another variant, the said polymer may also be dried.

The scope and interest of the invention will be better appreciated through the following examples, which are by no means limitative.

EXAMPLES

Preliminary remark: all the calcium carbonates described in the examples have been treated using compounds of the fatty acid type.

In all the examples, the molecular weight of the polymers used is determined according to the method explained below, by Steric Exclusion Chromatography (CES).

1 mL of the polymer solution is put on a capsule, which is then evaporated at ambient temperature in a vane pump vacuum. The solute is recovered by 1 mL of the eluent of the CES, and the whole is then injected in the CES equipment. The CES eluent is an $NaHCO_3$ solution: 0.05 mole/L, $NaNO_3$ 0.1 mole/L, triethylamine 0.02 mole/L, $NaN_3$ 0.03% by mass. The CES chain contains an isocratic pump (Waters™ 515) the flow rate of which is regulated at 0.5 mL/min., an oven containing a precolumn of the "Guard Column Ultrahydrogel Waters™" type, a linear column measuring 7.8 mm internal diameter and 30 cm length of the "Ultrahydrogel Waters™" type, and a refractometric detector of the RI Waters™ 410 type. The oven is heated to a temperature of 60° C. and the refractometer to 50° C. The chromatogram's detection and processing application is the SECential application, supplied by "L.M.O.P.S. CNRS, Chemin du Canal, Vernaison, 69277". The CES is calibrated by a series of 5 sodium poly(acrylate) standards supplied by Polymer Standards Service™.

Example 1

This example illustrates the process of manufacture of thermoplastic materials, containing at least one PVC-resin and calcium carbonate, a thermoplastic material into which the following have been introduced:
- either the comb polymer use of which forms the subject of the present invention, in the form of dry powder resulting from a stage of grinding in a wet medium of calcium carbonate in the presence of the said polymer, and drying of the suspension obtained,
- or a polymer of the prior art, in the form of dry powder resulting from a stage of grinding in a wet medium of calcium carbonate in the presence of this said polymer, and drying of the suspension obtained Composition of the Thermoplastic Materials For each of the tests n° 1 to 10, the thermoplastic compositions manufactured use:
- a PVC resin sold by the company ARKEMA™ under the name Lacovyl™ S110P
- titanium dioxide sold by the company KRONOS™ under the name Kronos™ 2200
- a thermal stabiliser sold by the company BARLOCHER™ under the name One Pack Baeropan™
- a lubricant sold by the company LAPASSE ADDITIVES CHEMICALS™ under the name Lacowax™ EP
- an organic impact modifier additive of the core-shell type sold by the company ARKEMA™ under the name Durastrength™ 320
- calcium carbonate in powder form, manufacture of which is described in greater detail below
- a comb polymer according to the invention or a grinding agent of prior art, the nature of which is described in greater detail below The quantities used have been indicated in table 1.

Obtaining Dry Powders of Calcium Carbonate

The aqueous suspensions of calcium carbonate obtained by grinding with grinding aid agents of prior art or a comb polymer according to the invention were dried in powder form using a drying fountain of the Niro Minor Mobile 2000 type sold by the company NIRO™.

The characteristics of this drying are:
- gas inlet temperature: 350° C.
- gas outlet temperature: 102-105° C.
- ventilation 99% open
- air pressure: 4 bars Manufacture of Dry PVC Mixtures For each of the tests n° 1 to 10, one commences by mixing the different constituents used in the composition of the thermoplastic materials. Such mixtures are made in a mixer of the Guedu™ type of 5 litre capacity according to the following cycle:
- heating to 50° C. of the mixer for 30 minutes;
- introduction of the PVC resin with an increase of the temperature to 90° C.
- addition of the constituents except for the calcium carbonate
- raising of temperature to 115° C. and addition of calcium carbonate
- stirring for 15 minutes followed by discharge Extrusion of Dry PVC Mixtures All the dry mixtures were extruded with a Thermoelectron Polylab™ system fitted with a twin-screw and a sheet and plate die (25 mm×3 mm).

The PVC profiles are then calibrated at 15° C. in a water bath and laminated on a Yvroud system. The extrusion parameters are:
- temperatures of the 4 zones: 170-180-190-195° C.
- screw speed: 30 rpm Measurement of Impact Resistances The impact resistance measurements are made according to norm British Standard BS 7413: 2003. The measurements were averaged over batches of 10 test samples manufactured with the Diadisc™ 4200 machine sold by the company MUTRONIC™.

Tests N° 1, 2 and 3

These tests illustrate the prior art.

These tests use an aqueous suspension of calcium carbonate sold by the company OMYA™ under the name Hydrocarb™ 95 T, obtained by grinding in a wet medium of calcium carbonate with an acrylic polymer of prior art, 55% by weight of the particles of which have a diameter of less than 1 µm as measured by a device of the Sedigraph™ 5100 type sold by the company MICROMERITICS™.

The said suspension was dried according to the method previously described.

Tests n° 1, 2 and 3 use respectively 8, 11 and 14 parts of the dry powder obtained and 6 parts of impact additive.

Tests N° 4, 5 and 6

These tests illustrate the invention.

These tests use an aqueous suspension of calcium carbonate, 55% by weight of the particles of which have a diameter of less than 1 µm as measured by a device of the Sedigraph™ 5100 type sold by the company MICROMERITICS™, obtained by grinding calcium carbonate with 0.7% by dry weight relative to the dry weight of calcium carbonate, of a comb polymer of molecular weight 35,000 g/mol, obtained by a controlled radical polymerisation process in water of:
- 92% by weight of methoxy polyethylene glycol methacrylate of molecular weight 2,000 g/mot,
- 8% of acrylic acid.

totally neutralised by soda.

The said suspension was dried according to the method previously described.

Tests n° 4, 5 and 6 use respectively 8, 11 and 14 parts of the dry powder obtained and 6 parts of impact additive.

Tests N° 7 and 8

These tests illustrate the prior art.

These tests use an aqueous suspension of calcium carbonate sold by the company OMYA™ under the name Hydrocarb™ 120 T, obtained by grinding in a wet medium of calcium carbonate with an acrylic polymer of prior art, 78% by weight of the particles of which have a diameter of less than 1 µm as measured by a device of the Sedigraph™ 5100 type sold by the company MICROMERITICS™.

The said suspension was dried according to the method previously described.

Tests n° 7 and 8 use respectively 8 and II parts of the dry powder obtained and 6 parts of impact additive.

Tests N° 9 and 10

These tests illustrate the invention.

These tests use an aqueous suspension of calcium carbonate, 78% by weight of the particles of which have a diameter of less than 1 µm as measured by a device of the Sedigraph™ 5100 type sold by the company MICROMERITICS™, obtained by grinding in a wet medium of calcium carbonate with 1.0% by dry weight relative to the dry weight of calcium carbonate, of a comb polymer of molecular weight 35,000 g/mol, obtained by a controlled radical polymerisation process in water of:
- 92% by weight of methoxy polyethylene glycol methacrylate of molecular weight 2,000 g/mol,
- 8% of acrylic acid.

totally neutralised by soda.

The said suspension was dried according to the method previously described.

Tests n° 9 and 10 use respectively 8 and 11 parts of the dry powder obtained and 6 parts of impact additive.

For each of the tests n° 1 to 10, the compositions of the thermoplastic formulations produced, together with the corresponding values of the impact resistances, are given in table 1.

TABLE 1 composition of the different thermoplastic formulations and corresponding values of impact resistances

| | Test n° | | | | | | | | | |
|---|---|---|---|---|---|---|---|---|---|---|
| | 1 | 2 | 3 | 4 | 5 | 6 | 7 | 8 | 9 | 10 |
| Prior art/Invention (PA/IN) | PA | PA | PA | IN | IN | IN | PA | PA | IN | IN |
| Lacovyl | 100 | 100 | 100 | 100 | 100 | 100 | 100 | 100 | 100 | 100 |
| Kronos 2200 | 5 | 5 | 5 | 5 | 5 | 5 | 5 | 5 | 5 | 5 |
| One Pack Baeropan | 2.5 | 2.5 | 2.5 | 2.5 | 2.5 | 2.5 | 2.5 | 2.5 | 2.5 | 2.5 |
| Lacowax | 0.05 | 0.05 | 0.05 | 0.05 | 0.05 | 0.05 | 0.05 | 0.05 | 0.05 | 0.05 |
| Durastrength | 6 | 6 | 6 | 6 | 6 | 6 | 6 | 6 | 6 | 6 |
| Durastrength + 1% polymer* | 0 | 0 | 0 | 0 | 0 | 0 | 0 | 0 | 0 | 0 |
| Hydrocarb 95 T | 8 | 11 | 14 | 0 | 0 | 0 | 0 | 0 | 0 | 0 |
| Hydrocarb 95 T + 0.7% polymer* | 0 | 0 | 0 | 8 | 11 | 14 | 0 | 0 | 0 | 0 |
| Hydrocarb 120 T | 0 | 0 | 0 | 0 | 0 | 0 | 8 | 11 | 0 | 0 |
| Hydrocarb 120 T + 1.0% polymer* | 0 | 0 | 0 | 0 | 0 | 0 | 0 | 0 | 8 | 11 |
| Impact (kJ/m²) | 9.92 | 10.88 | 12.19 | 10.96 | 12.74 | 14.41 | 9.3 | 14.1 | 11.9 | 13.1 |
| Standard deviation | 0.52 | 0.32 | 0.55 | 0.39 | 2.22 | 1.01 | 1.69 | 1.47 | 1.23 | 1.08 |

*polymer designates the comb polymer of molecular weight 35,000 g/mol, obtained by a controlled radical polymerisation process in water of 92% by weight of methoxy polyethylene glycol methacrylate of molecular weight 2,000 g/mol, and 8% by weight of acrylic acid.

A constant quantity of organic impact modifier (6 parts), a comparison between tests 1 and 4, 2 and 5, 3 and 6 in relation to a calcium carbonate, 55% by weight of the particles of which are less than 1 µm in size on the one hand, and a comparison between tests 7 and 9, 8 and 10, in relation to a calcium carbonate, 78% by weight of the particles of which are less than 1 µm in size on the one hand demonstrate that the impact resistances are always higher in the case of calcium carbonate which has been previously ground according to the invention in a wet medium in the presence of the comb polymer.

The contribution of the comb polymer, via the grinding process in a wet medium of the calcium carbonate, thus enables the impact resistance of the thermoplastic resins to be exacerbated.

Furthermore, it has been checked that the module of each of the thermoplastic compositions is constant and equal to 1900±100 MPa.

Example 2

This example illustrates the process of manufacture of thermoplastic materials, containing at least one PVC resin and calcium carbonate, a thermoplastic material into which the following have been introduced:

either the comb polymer, use of which forms the subject of the present invention:
 in the form of dry powder resulting from a stage of grinding in aqueous medium of calcium carbonate in the presence of the said polymer, and drying of the suspension obtained,
 or in the form of dry powder resulting from the mixture of the said polymer with an impact modifier,
 or again in the form of dry powder introduced into a mixture in the extruder with the other constituents,
or a polymer of the prior art, in the form of dry powder resulting from a stage of grinding in a wet medium of calcium carbonate in the presence of this said polymer, and drying of the suspension obtained Test N° 11

This test illustrates the prior art.

This test uses an aqueous suspension of calcium carbonate sold by the company OMYA™ under the name Hydrocarb™ 95 T, obtained by grinding of calcium carbonate with an acrylic polymer of prior art, 55% by weight of the particles of which have a diameter of less than 1 µm as measured by a device of the Sedigraph™ 5100 type sold by the company MICROMERITICS™.

The said suspension was dried according to the method previously described.

This test uses 8 parts of the dry powder obtained and 5 parts of impact additive.

Test N° 12

This test illustrates the invention.

This test uses an aqueous suspension of calcium carbonate, 55% by weight of the particles of which have a diameter of less than 1 µm as measured by a device of the Sedigraph™ 5100 type sold by the company MICROMERITICS™, obtained by grinding in a wet medium of calcium carbonate with 0.7% by dry weight relative to the dry weight of calcium carbonate, of a comb polymer of molecular weight 35,000 g/mol, obtained by a controlled radical polymerisation process in water of:

92% by weight of methoxy polyethylene glycol methacrylate of molecular weight 2,000 g/mol,
 8% by weight of acrylic acid.

totally neutralised by soda.

The said suspension was dried according to the method previously described.

This test uses 8 parts of the dry powder obtained and 5 parts of impact additive.

Test N° 13

This test illustrates the invention.

This test uses an aqueous suspension of calcium carbonate sold by the company OMYA™ under the name Hydrocarb™ 95 T, obtained by grinding in a wet medium of calcium carbonate with an acrylic polymer of prior art, 55% by weight of the particles of which have a diameter of less than 1 µm as measured by a device of the Sedigraph™ 5100 type sold by the company MICROMERITICS™.

The said suspension was dried according to the method previously described.

This test uses 8 parts of the dry powder obtained and 5 parts of a mixture between the impact additive and 1% by dry weight relative to the dry weight of calcium carbonate of a comb polymer of molecular weight 35,000 g/mol, obtained by a process of controlled radical polymerisation in water of:
- 92% by weight of methoxy polyethylene glycol methacrylate of molecular weight 2,000 g/mol,
- 8% by weight of acrylic acid.

totally neutralised by soda.

Test N° 14

This test illustrates the invention.

This test uses an aqueous suspension of calcium carbonate sold by the company OMYA™ under the name Hydrocarb™ 95 T, obtained by grinding in a wet medium of calcium carbonate with an acrylic polymer of prior art, 55% by weight of the particles of which have a diameter of less than 1 μm as measured by a device of the Sedigraph™ 5100 type sold by the company MICROMERITICS™.

The said suspension was dried according to the method previously described.

This test uses 8 parts of the dry powder obtained and 5 parts of impact additive, together with 0.05% by weight of a comb polymer of molecular weight 35,000 g$\mu$mol, obtained by a process of controlled radical polymerisation in water of:
- 92% by weight of methoxy polyethylene glycol methacrylate of molecular weight 2,000 g/mol,
- 8% by weight of acrylic acid, totally neutralised by soda.

where the said comb polymer is introduced directly into the extruding machine in the form of dry powder, with the other constituents.

For tests n° 11 to 14, the dry mixtures were extruded according to the method previously described, and the impact resistance measurements were taken as indicated above.

The results are shown in table 2, where the results obtained for test n° 1 have also been reported.

Test n° 11, in comparison with test n° 1, illustrates the loss of impact resistance caused by the reduction of the quantity of impact modifier.

Test n° 12 demonstrates that it is possible to compensate for this reduction through the addition of the comb polymer, via the calcium carbonate ground in a wet medium in the presence of the said polymer. Not only is the impact resistance obtained higher than that of the same composition incorporating the same quantity of impact additive (5 parts according to test n° 11), but it is also higher than that obtained for a composition incorporating a greater quantity of impact modifier (6 parts according to test n° 1).

It is also possible to compensate for this reduction of impact resistance through the addition of the comb polymer in combination in powder form with the impact additive: this is the purpose of test n° 13.

Finally, test n° 14 demonstrates that it is possible to compensate for this reduction through the incorporation of the comb polymer in powder form with the other constituents of the composition.

Furthermore, it has been checked that the module of each of the thermoplastic compositions is constant and equal to 1900±100 MPa. There is thus no degradation of rigidity if one uses the process according to the invention.

Example 3

This example illustrates the process of manufacture of thermoplastic materials, containing at least one PVC resin and calcium carbonate, a thermoplastic material into which the following have been introduced:
- either the comb polymer use of which forms the subject of the present invention, in the form of dry powder resulting from a stage of grinding in a dry medium of calcium carbonate in the presence of the said polymer,
- or a polymer of the prior art, in the form of dry powder resulting from a stage of grinding in a dry medium of calcium carbonate in the presence of this said polymer.

Test N° 15

This test illustrates the prior art.

This test uses calcium carbonate sold by the company OMYA™ under the name Hydrocarb™ 75 T, obtained by grinding in a dry medium of calcium carbonate with 1500 ppm of monopropylene glycol, 50% by weight of the particles of which have a diameter of less than 1 μm as measured by a device of the Sedigraph™ 5100 type sold by the company MICROMERITICS™.

This test uses 8 parts of the dry powder obtained and 6 parts of impact additive.

Test N° 16

This test illustrates the invention.

This test uses calcium carbonate, 50% by weight of the particles of which have a diameter of less than 1 μm as measured by a device of the Sedigraph™ 5100 type sold by the company MICROMERITICS™, obtained by grinding in a dry medium of calcium carbonate with 1500 ppm of monopropylene glycol, and 0.7% by dry weight relative to the dry weight of calcium carbonate, of a comb polymer of molecular weight 35,000 g/mol, obtained by a controlled radical polymerisation process in water of:
- 92% by weight of methoxy polyethylene glycol methacrylate of molecular weight 2,000 g/mol,
- 8% by weight of acrylic acid, totally neutralised by soda.

This test uses 8 parts of the dry powder obtained and 6 parts of impact additive.

TABLE 2 composition of the different thermoplastic formulations and corresponding values of impact resistances

| | Test n° | | | | |
|---|---|---|---|---|---|
| | 1 | 11 | 12 | 13 | 14 |
| Prior art/Invention (PA/IN) | PA | PA | IN | IN | IN |
| Lacovyl | 100 | 100 | 100 | 100 | 100 |
| Kronos 2200 | 5 | 5 | 5 | 5 | 5 |
| One Pack Baeropan | 2.5 | 2.5 | 2.5 | 2.5 | 2.5 |
| Lacowax | 0.05 | 0.05 | 0.05 | 0.05 | 0.05 |
| Durastrength | 6 | 5 | 5 | 0 | 5 |
| Durastrength + 1% polymer* | 0 | 0 | 0 | 5 | 0 |
| Hydrocarb 95 T | 8 | 8 | 0 | 8 | 8 |
| Hydrocarb 95 T + 0.7% polymer* | 0 | 0 | 8 | 0 | 0 |
| Polymer | 0 | 0 | 0 | 0 | 0.05** |
| Impact (kJ/m$^2$) | 9.92 | 9.1 | 10.2 | 9.8 | 10.5 |
| Standard deviation | 0.52 | 0.5 | 0.4 | 0.45 | 0.5 |

*polymer designates the comb polymer of molecular weight 35,000 g/mol, obtained by a controlled radical polymerisation process in water of 92% by weight of methoxy polyethylene glycol methacrylate of molecular weight 2,000 g/mol, and 8% by weight of acrylic acid.
**0.05 here indicates the percentage by dry weight of comb polymer relative to the total dry weight of calcium carbonate For tests n° 15 and 16, the dry mixtures were extruded according to the method previously described, and the impact resistance measurements were taken as indicated above.

The results are shown in table 3.

TABLE 3 composition of the different thermoplastic formulations and corresponding values of impact resistances

|  | Test n° | |
|---|---|---|
|  | 15 | 16 |
| Prior art/Invention (PA/IN) | PA | IN |
| Lacovyl | 100 | 100 |
| Kronos 2200 | 5 | 5 |
| One Pack Baeropan | 2.5 | 2.5 |
| Lacowax | 0.05 | 0.05 |
| Durastrength | 6 | 6 |
| Hydrocarb 75 T | 8 | 0 |
| Hydrocarb 75 T + 0.7% polymer* | 0 | 8 |
| Impact (kJ/m$^2$) | 9.0 | 9.8 |
| Standard deviation | 0.3 | 0.5 |

*polymer designates the comb polymer of molecular weight 35,000 g/mol, obtained by a controlled radical polymerisation process in water of 92% by weight of methoxy polyethylene glycol methacrylate of molecular weight 2,000 g/mol, and 8% by weight of acrylic acid.

These results demonstrate that the addition of the above-mentioned comb polymer in the thermoplastic formulation, via the calcium carbonate which it has enabled to grind in a dry medium with the aid of monopropylene glycol, enables the impact resistance of the thermoplastic composition obtained to be improved.

Furthermore, it has been checked that the module of each of the thermoplastic compositions is constant and equal to 1900±100 MPa. There is thus no diminution of the rigidity of the thermoplastic compositions.

Example 4

This example illustrates the process of manufacture of thermoplastic materials, containing at least one PVC resin and natural of precipitated calcium carbonate, a thermoplastic material into which the following have been introduced:
  either the comb polymer, the use of which forms the subject of the present invention in the form of dry powder resulting from the introduction of the said polymer into an aqueous suspension of natural or precipitated calcium carbonate, and drying of the obtained suspension,
  or a polymer of prior art, in the form of dry powder resulting from the introduction (case of precipitated calcium carbonate) of a polymer of prior art into an aqueous suspension of natural or precipitated calcium carbonate, and drying of the obtained suspension.

Test N° 17

This test illustrates the prior art.

This test uses a precipitated calcium carbonate sold by the company SOLVAY™ under the name Socal™ 312 S, in the form of an aqueous dispersion produced in the presence of 0.7% by dry weight relative to the dry weight of calcium carbonate of an acrylic polymer of prior art.

The said suspension was dried according to the method previously described.

This test uses 8 parts of the dry powder obtained and 6 parts of impact additive.

Test N° 18

This test illustrates the invention.

This test uses a precipitated calcium carbonate sold by the company SOLVAY™ under the name Socal™ 312 S, in the form of an aqueous dispersion into which has been added 0.7% by dry weight, relative to the dry weight of calcium carbonate, of a comb polymer of molecular weight 35,000 g/mol, obtained by a process of controlled radical polymerisation in water of:
  92% by weight of methoxy polyethylene glycol methacrylate of molecular weight 2,000 g/mol,
  8% by weight of acrylic acid,
totally neutralised by soda.

The said suspension was dried according to the method previously described.

This test uses 8 parts of the dry powder obtained and 6 parts of impact additive.

Test N° 18

This test illustrates the invention.

This test uses a natural calcium carbonate sold by the company OMYA™ under the name Omyacarb™ 95 T, in the form of an aqueous dispersion into which has been added 0.7% by dry weight, relative to the dry weight of calcium carbonate, of a comb polymer of molecular weight 35,000 g/mol, obtained by a process of controlled radical polymerisation in water of:
  92% by weight of methoxy polyethylene glycol methacrylate of molecular weight 2,000 g/mol,
  8% by weight of acrylic acid,
totally neutralised by soda.

The said suspension was dried according to the method previously described.

This test uses 8 parts of the dry powder obtained and 6 parts of impact additive.

The results are shown in table 4.

TABLE 4 composition of the different thermoplastic formulations and corresponding values of impact resistances.

|  | Test n° | | | |
|---|---|---|---|---|
|  | 17 | 18 | 1 | 19 |
| Prior art/Invention (PA/IN) | PA | IN | PA | IN |
| Lacovyl | 100 | 100 | 100 | 100 |
| Kronos 2200 | 5 | 5 | 5 | 5 |
| One Pack Baeropan | 2.5 | 2.5 | 2.5 | 2.5 |
| Lacowax | 0.05 | 0.05 | 0.05 | 0.05 |
| Durastrength | 6 | 6 | 6 | 6 |
| Socal 312 S | 8 | 0 | 0 | 0 |
| Socal 312 S + 0.7% polymer* | 0 | 8 | 0 | 0 |
| Hydrocarb 95 T | 0 | 0 | 8 | 0 |
| Hydrocarb 95 T + 0.7% polymer* | 0 | 0 | 0 | 8 |
| Impact (kJ/m$^2$) | 11.0 | 12.0 | 9.92 | 10.9 |
| Standard deviation | 0.8 | 0.5 | 0.52 | 0.6 |

*polymer designates the comb polymer of molecular weight 35,000 g/mol, obtained by a controlled radical polymerisation process in water of 92% by weight of methoxy polyethylene glycol methacrylate of molecular weight 2,000 g/mol, and 8% by weight of acrylic acid.

These results demonstrate that the addition of the above-mentioned comb polymer into the thermoplastic formulation, via natural or precipitated calcium carbonate, with which it has been mixed in a wet medium and then dried, enables the impact resistance of the thermoplastic composition obtained to be improved, compared to the same composition which does not contain the comb polymer.

Furthermore, it has been checked that the module of each of the thermoplastic compositions is constant and equal to 1900±100 MPa. There is thus no diminution of the rigidity of the thermoplastic compositions.

Example 5

This example illustrates the process of manufacture of thermoplastic materials, containing at least one PVC resin and natural calcium carbonate, a thermoplastic material into which the following have been introduced:
- either the comb polymer use of which forms the subject of the present invention in the form of dry powder resulting from the introduction of the said polymer into an aqueous suspension of natural calcium carbonate which has previously been ground with a grinding aid agent of the polyacrylic type of the prior art, and drying of the suspension obtained (tests 22 to 28),
- or the comb polymer, the use of which forms the subject of the present invention in the form of dry powder resulting from the introduction of the said polymer during a stage of aqueous dispersion of natural calcium carbonate (test 21),
- or a polymer of prior art, in the form of dry powder resulting from the introduction of a polymer of prior art into an aqueous suspension of natural or precipitated calcium carbonate, and drying of the suspension obtained (test 20).

Test N° 20

This test illustrates the prior art.

This test uses an aqueous suspension of calcium carbonate which is a calcite from Orgon (France), which has been ground with 0.7% by dry weight of a homopolymer of acrylic acid, relative to the dry weight of calcium carbonate.

The said suspension was dried according to the method previously described.

This test uses 8 parts of the dry powder obtained and 6 parts of impact additive.

Test N° 21

This test illustrates the invention.

This test uses an aqueous suspension of calcium carbonate which is a calcite from Orgon (France), which is dispersed with 0.7% by dry weight, relative to the dry weight of calcium carbonate, of a comb polymer of molecular weight 58,000 g/mole, obtained by a process of controlled radical polymerisation in water of:
- 80% by weight of methoxy polyethylene glycol methacrylate of molecular weight 2,000 g/mol,
- 13.6% by weight of acrylic acid,
- 4.9% by weight of methacrylic acid,
- 1.5% by weight of butoxypolyoxypropylene hemimaleate containing 19 units of oxypropylene, totally neutralised by potassium.

The said suspension was dried according to the method previously described.

This test uses 8 parts of the dry powder obtained and 6 parts of impact additive.

Test N° 22

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 107,700 g/mole, obtained by a process of controlled radical polymerisation in water of:
- 91.5% by weight of methoxy polyethylene glycol methacrylate of molecular weight 5,000 g/mol;
- 6% by weight of ethylene glycol methacrylate phosphate,
- 1.8% by weight of methacrylic acid,
- 0.7% by weight of butoxypolyoxypropylene hemimaleate containing 19 units of oxypropylene, of which 80% by mole of the carboxylic sites have been neutralised by sodium.

The said suspension was dried according to the method previously described.

This test uses 8 parts of the dry powder obtained and 6 parts of impact additive.

Test N° 23.

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 200,950 g/mole, obtained by a process of controlled radical polymerisation in water of:
- 82.5% by weight of methoxy polyethylene-glycol methacrylate of molecular weight 5,000 g/mol,
- 6% by weight of ethylene glycol methacrylate phosphate,
- 1.6% by weight of methacrylic acid,
- 9.2% by weight of methyl methacrylate,
- 0.7% by weight of butoxypolyoxypropylene hemimaleate containing 19 units of oxypropylene, totally neutralised by soda.

The said suspension was dried according to the method previously described.

This test uses 8 parts of the dry powder obtained and 6 parts of impact additive.

Test N° 24

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 54,650 g/mole, obtained by a process of controlled radical polymerisation in water of:
- 78.2% by weight of methoxy polyethylene glycol methacrylate of molecular weight 5,000 g/mol,
- 15% by weight of acrylic-acid,
- 1.5% by weight of methacrylic acid,
- 4.6% by weight of stearyl methacrylate,
- 0.7% by weight of butoxypolyoxypropylene hemimaleate containing 19 units of oxypropylene, totally neutralised by soda.

The said suspension was dried according to the method previously described.

This test uses 8 parts of the dry powder obtained and 6 parts of impact additive.

Test N° 25

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 101,650 g/mole, obtained by a process of controlled radical polymerisation in water of:
- 80.7% by weight of methoxy polyethylene glycol methacrylate of molecular weight 5,000 g/mol,
- 8.1% by weight of acrylic acid,
- 1.6% by weight of methacrylic acid,
- 9% by weight of tristyrylphenol methacrylate having 40 ethylene oxide units,
- 0.6% by weight of butoxypolyoxypropylene hemimaleate containing 19 units of oxypropylene, totally neutralised by soda.

The said suspension was dried according to the method previously described.

This test uses 8 parts of the dry powder obtained and 6 parts of impact additive.

Test N° 26

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 91,500 g/mole, obtained by a process of controlled radical polymerisation in water of:
- 86.6% by weight of methoxy polyethylene glycol methacrylate of molecular weight 5,000 g/mol,
- 6.0% by weight of acrylic acid,
- 1.7% by weight of methacrylic acid,
- 5% by weight of a sililated monomer sold by the company DEGUSSA™ under the name Dynasylan™ Memo,
- 0.6% by weight of butoxypolyoxypropylene hemimaleate containing 19 units of oxypropylene, totally neutralised by soda.

The said suspension was dried according to the method previously described.

This test uses 8 parts of the dry powder obtained and 6 parts of impact additive.

Test N° 27

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 101,650 g/mole, obtained by a process of controlled radical polymerisation in water of:
- 81.7% by weight of methoxy polyethylene glycol methacrylate of molecular weight 5,000 g/mol,
- 15-6.0% by weight of acrylic acid,
- 1.6% by weight of methacrylic acid,
- 10% by weight of methacryloyloxyethyltrimethylammonium chloride,
- 0.7% by weight of butoxypolyoxypropylene hemimaleate containing 19 units of oxypropylene, totally neutralised by soda.

The said suspension was dried according to the method previously described.

This test uses 8 parts of the dry powder obtained and 6 parts of impact additive.

Test N° 28

This test illustrates the invention.

This test uses an aqueous suspension of calcium carbonate which is a calcite from Orgon (France), which has been ground with 0.7% by dry weight of a homopolymer of acrylic acid, relative to the dry weight of calcium carbonate.

Into the said suspension was then introduced 0.7% by dry weight, relative to the dry weight of calcium carbonate, of a comb polymer of molecular weight 21,100 g/mole, obtained by a process of controlled radical polymerisation in water of:
- 78.9% by weight of methoxy polyethylene glycol methacrylate of molecular weight 2,000 g/mol,
- 18.2% by weight of methacrylic acid,
- 2.9% by weight of butoxypolyoxypropylene hemimaleate containing 19 units of oxypropylene, totally neutralised by soda.

The said suspension was dried according to the method previously described.

This test uses 8 parts of the dry powder obtained and 6 parts of impact additive.

The results are shown in table 5.

TABLE 5 composition of the different thermoplastic formulations and corresponding values of impact resistances

| | Test n° | | | | | | | | |
|---|---|---|---|---|---|---|---|---|---|
| | 20 | 21 | 22 | 23 | 24 | 25 | 26 | 27 | 28 |
| Prior art/Invention (PA/IN) | PA | IN | IN | IN | IN | IN | IN | IN | IN |
| Lacovyl | 100 | 100 | 100 | 100 | 100 | 100 | 100 | 100 | 100 |
| Kronos 2200 | 5 | 5 | 5 | 5 | 5 | 5 | 5 | 5 | 5 |
| One Pack Baeropan | 2.5 | 2.5 | 2.5 | 2.5 | 2.5 | 2.5 | 2.5 | 2.5 | 2.5 |
| Lacowax | 0.05 | 0.05 | 0.05 | 0.05 | 0.05 | 0.05 | 0.05 | 0.05 | 0.05 |
| Durastrength | 6 | 6 | 6 | 6 | 6 | 6 | 6 | 6 | 6 |
| $CaCO_3$ ground with 0.7% of polymer of the prior art | 16 | 0 | 0 | 0 | 0 | 0 | 0 | 0 | 0 |
| $CaCO_3$ dispersed with 0.7% of polymer of the invention | 0 | 16 | 0 | 0 | 0 | 0 | 0 | 0 | 0 |
| $CaCO_3$ ground with 0.7% of polymer of the prior art followed by an addition of 0.7% of polymer according to the invention | 0 | 0 | 18 | 18 | 18 | 18 | 18 | 18 | 18 |
| Impact (kJ/m$^2$) | 19.9 | 21.3 | 20.1 | 19.9 | 20.5 | 20.6 | 19.9 | 20.4 | 19.9 |

These results demonstrate that the addition of the above-mentioned comb polymer in the thermoplastic formulation, via the natural calcium carbonate with which it has been added, or which it has enabled to disperse in an aqueous medium, and then dried, enables:
- an impact resistance at least equal to that obtained for the formulation of the prior art to be obtained for the formulation according to the invention,
- and the proportion of calcium carbonate in the composition according to the invention to be increased.

Example 6

This example illustrates the process of manufacture of thermoplastic materials, containing at least one polyethylene resin and natural calcium carbonate, a thermoplastic material into which the following have been introduced:

either the comb polymer, the use of which forms the subject of the present invention in the form of dry powder resulting from the introduction of the said polymer into an aqueous suspension of natural or precipitated calcium carbonate which has been previously ground with the said polymer, and drying of the said suspension or a polymer of the prior art, in the form of dry powder resulting from the introduction of a polymer into an aqueous suspension of natural calcium carbonate which has been previously ground with the said polymer, followed by drying of the said suspension.

For tests 29 and 30, filled polyethylene films are produced, by extrusion of the resin in the presence of calcium carbonate ground with the polymer according to the invention or according to the prior art.

The resin is a linear low-density resin (LLDPE) of fluidity index equal to 1 (or MFI, according to the term well known to the skilled man in the art) and of density equal to 0.92 g/cm$^3$.

The extrusion parameters are:
speed of 70 rpm,
pressure of 300 bar,
temperature of 200° C.

By this means films with a thickness of 45 μm are obtained.

Test N° 29

This test illustrates the prior art.

This test uses an aqueous suspension of calcium carbonate which is a calcite from Orgon (France), which has been ground with 0.7% by dry weight of a homopolymer of acrylic acid, relative to the dry weight of calcium carbonate.

The said suspension was dried according to the method previously described.

This test uses 14% by dry weight of calcium carbonate relative to the dry weight of polyethylene resin.

Test N° 30

This test illustrates the invention.

This test uses an aqueous suspension of calcium carbonate which is a calcite from Orgon (France), which is dispersed with 0.7% by dry weight, relative to the dry weight of calcium carbonate, of a comb polymer of molecular weight 58,000 g/mole, obtained by a process of controlled radical polymerisation in water of:

92% by weight of methoxy polyethylene glycol methacrylate of molecular weight 5,000 g/mol, 8% by weight of acrylic acid, totally neutralised by soda.

The said suspension was dried according to the method previously described.

This test uses 14% by dry weight of calcium carbonate relative to the dry weight of polyethylene resin.

For tests n° 29 and 30, the impact resistance of the films obtained is determined by the test known as a "dart drop" test, which is well known to the skilled man in the art, carried out according to the norm ASTM D 1709/A.

A value of 206 grams is obtained for test n° 29 and a value of 216 grams for test n° 30. This therefore demonstrates that the use of the polymer according to the invention improves the impact resistance of the filled polyethylene film according to the present invention.

The invention claimed is:

1. A process for manufacture of a thermoplastic material for use in the manufacture of plastics, comprising the step of combining:

(a) at least one thermoplastic resin selected from halogenated resins, polyvinyl chloride (PVC), post-chlorinated vinyl polychloride (PVCC), vinylidene polyfluoride (PVDF), styrenic resins, styrene-butadiene copolymers, styrene-acrylonitrile resins, acrylate-butadiene-styrene resins, methylmethacrylate styrene copolymers, acrylic resins, methyl polymethacrylate, polylenes, polypropylenes, polycarbonate resins, unsaturated polyester resins, terephthalate polyethylene, terephthalate polybutylenes, polyurethane resins, polyamide resins, or a mixture thereof, (b) at least one mineral or carbonated filler, and (c) optionally at least one other additive chosen from a thermal stabiliser and/or a UV stabiliser and/or a lubricant and/or a rheology modifier and/or an organic impact modifier, wherein at least one comb polymer, containing at least one polyalkylene oxide function grafted onto at least one ethylenic unsaturated monomer, is introduced into the thermoplastic resin, the mineral or carbonated filler, the at least one other additive, or the thermoplastic material, to improve the impact resistance of the thermoplastic material, wherein the comb polymer comprises:

(a) at least one anionic monomer with a carboxylic or dicarboxylic or phosphoric or phosphonic or sulphonic function, or their mixtures, (b) at least one non-ionic monomer, where the non-ionic monomer consists of at least one monomer of formula (I):

$$R\left[\left[\begin{array}{c}R_1\\|\\-\!\!\!\!\!-\!\!\!\!\!-\\|\\O\end{array}\right]_m\left[-\!\!\!\!\!-\!\!\!\!\!-O\right]_n\left[\begin{array}{c}R_2\\|\\-\!\!\!\!\!-\!\!\!\!\!-\\|\\O\end{array}\right]_p\right]_q R'$$

where:

m and p represent a number of alkylene oxide units of less than or equal to 150, n represents a number of ethylene oxide units of less than or equal to 150, q represents an integer at least equal to 1 and such that $5 \leq (m+n+p)q \leq 150$, $R_1$ represents hydrogen or the methyl or ethyl radical, $R_2$ represents hydrogen or the methyl or ethyl radical, R represents a radical containing an unsaturated polymerisable function, chosen from vinylics, acrylic, methacrylic, maleic, itaconic, crotonic, vinylphthalic esters, or unsaturated urethanes, acrylurethane, methacrylurethane, α-α' dimethyl-isopropenyl-benzylurethane, allylurethane, or allylic or vinylic ethers, whether or not substituted, or ethylenically unsaturated amides or imides, R' represents hydrogen or a hydrocarbonated radical having 1 to 40 carbon atoms, or an ionic or ionisable grouping chosen from a phosphate, a phosphonate, a sulphate, a sulphonate, a carboxylic, or a primary, secondary or tertiary amine, or a quaternary ammonium, or mixtures, or a mixture of several monomers of formula (I), (c) optionally at least one monomer of the acrylamide or methacrylamide type, N-[3-(dimethylamino)propyl] acrylamide or N-[3-(dimethylamino)propyl]methacrylamide, and their mixtures, or at least one non-water soluble monomer chosen from alkyl acrylates or methacrylates, the unsaturated esters, N-[2-(dimethylamino) ethyl]methacrylate, or N-[2-(dimethylamino)ethyl] acrylate, vinylics, vinyl acetate, vinylpyrrolidone, styrene, alphamethylstyrene, and their derivates, or at least one cationic monomer or quaternary ammonium, [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or mixtures thereof, and (d) optionally at least one monomer having at least two ethylenic unsaturations.

2. The process according to claim 1, wherein the comb polymer is:
1. introduced into the mineral or carbonated filler in the form of dry powder, resulting from the stages of:
    grinding and/or dispersion in a wet medium of the mineral or carbonated filler in the presence of the polymer, and optionally in the presence of at least one other grinding agent using a wet method and/or at least one other dispersant,
    drying of the dispersion and/or of the aqueous suspension of mineral or carbonated matter obtained, with optional introduction of the polymer, treatment followed by optional classification of the powder obtained; and/or
2. introduced into the mineral or carbonated filler in the form of dry powder, resulting from the stages of:
    dry grinding of the mineral or carbonated filler in the presence of the polymer, and optionally in the presence of at least one other dry grinding agent,
    treatment followed by optional classification of the powder obtained, and/or
3. introduced into the mineral or carbonated filler in the form of dry powder, resulting from the stages of:
    introduction of the polymer into a dispersion and/or into an aqueous suspension containing the mineral or carbonated filler,
    drying of the dispersion and/or of the aqueous suspension of mineral or carbonated matter obtained, with optional introduction of the polymer, followed by treatment and optional classification of the powder obtained, and/or
4. introduced into the thermoplastic material in the form of dry powder mixed with the other constituents a), b) and c), and/or
5. introduced into the at least one other additive in the form of dry powder, resulting from the stages of:
    introduction of the polymer into a suspension and/or an emulsion of at least one additive chosen from a thermal stabiliser and/or a UV stabiliser and/or a lubricant and/or a rheology modifier and/or an organic impact modifier,
    drying of the suspension and/or of the emulsion obtained in the optional presence of the polymer, followed optionally by classification of the powder obtained.

3. The process according to claim 1, wherein the thermoplastic resin is chosen from halogenated resins, PVC, post-chlorinated vinyl polychloride (PVCC), vinylidene polyfluoride (PVDF), acrylic resins, methyl polymethacrylate, polycarbonate resins, unsaturated polyester resins, terephthalate polyethylene or terephthalate polybutylenes.

4. The process according to claim 1, wherein the thermoplastic resin is PVC.

5. The process according to claim 1, wherein the mineral or carbonated filler is chosen from natural or synthetic calcium carbonate, dolomites, kaolin, talc, gypsum, titanium oxide, satin white, aluminium trihydroxide, mica, carbon black, talc-calcium carbonate mixtures, calcium carbonate-kaolin mixtures, mixtures of calcium carbonate with aluminium trihydroxide, mixtures with synthetic natural fibres, mineral co-structures, or co-structures of talc-calcium carbonate or talc-titanium dioxide.

6. The process according to claim 1, wherein the mineral or carbonated filler is natural or synthetic calcium carbonate or their mixtures.

7. The process according to claim 1, wherein the mineral or carbonated filler is natural calcium carbonate chosen from marble, calcite, chalk or their mixtures.

8. The process according to claim 1, which includes at least one other additive, and wherein the at least one other additive is an organic impact modifier chosen from impact additives comprising a core-shell, chlorinated polyolefines, styrene-butadiene rubbers (SBR), styrene-butadiene-styrenes (SBS), vinyl polyacetates, or their mixtures.

9. The process according to claim 8, wherein the organic impact modifier is chosen from the impact additives comprising a core-shell of acrylic, styrenic, or butadienic.

10. The process according to claim 8, wherein the impact modifier has an elastomer core comprising a polybutadiene and a shell comprising a polymethacrylate or polystyrene.

11. The process according to claim 1, wherein the thermoplastic material comprises:
    (a) at least one thermoplastic resin,
    (b) between 0.1 and 90% by dry weight of at least one mineral or carbonated filler, compared to the total weight of the thermoplastic material,
    (c) between 0 and 20% by dry weight of a thermal stabiliser and/or a UV stabiliser and/or a lubricant and/or a rheology modifier and/or an organic impact modifier, compared to the total weight of the thermoplastic material,
    (d) between 0.01 and 5% by dry weight of a comb polymer consisting of at least one ethylenic unsaturation monomer on to which is grafted at least one polyalkylene oxide function, compared to the dry weight of mineral or carbonated filler.

12. The process according to claim 11, wherein the thermoplastic material comprises between 5 and 20%, by dry weight of a thermal stabiliser and/or a UV stabiliser and/or a lubricant and/or a rheology modifier and/or an organic impact modifier, compared to the total weight of the thermoplastic material.

13. The process according to claim 11, wherein the thermoplastic material comprises between 0.1 and 3%, by dry weight of a comb polymer consisting of at least one ethylenic unsaturation monomer on to which is grafted at least one polyalkylene oxide function, compared to the dry weight of mineral or carbonated filler.

14. The process according to claim 1, wherein $15 \leq (m+n+p)q \leq 120$.

15. The process according to claim 1, wherein R' represents a hydrocarbonated radical having 1 to 12 carbon atoms.

16. The process according to claim 1, wherein R' represents a hydrocarbonated radical having 1 to 4 carbon atoms.

17. The process according to claim 1, wherein the comb polymer comprises:
    a) at least one anionic ethylenically unsaturated monomer chosen from ethylenic unsaturation monomers having a monocarboxylic function, or ethylenically unsaturated monomers having a dicarboxylic function, or ethylenically unsaturated monomers having a sulphonic function, or ethylenically unsaturated monomers having a phosphoric function, or ethylenically unsaturated monomers having a phosphonic function, or their mixtures,
    b) at least one monomer with a non-ionic ethylenic unsaturation of formula (I):

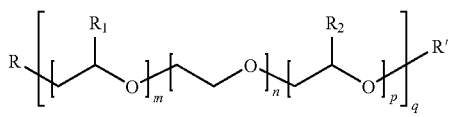

where:
- m and p represent a number of alkylene oxide units of less than or equal to 150,
- n represents a number of ethylene oxide units of less than or equal to 150,
- q represents a whole number at least equal to 1 and such that $5 \leq (m+n+p)q \leq 150$,
- $R_1$ represents hydrogen or the methyl or ethyl radical,
- $R_2$ represents hydrogen or the methyl or ethyl radical,
- R represents a radical containing an unsaturated polymerisable function, chosen from vinylics, or acrylic, methacrylic, maleic, itaconic, crotonic, vinylphthalic esters, or unsaturated urethanes, acrylurethane, methacrylurethane, α-α'dimethyl-isopropenyl-benzylurethane, allylurethane, or allylic or vinylic ethers, whether or not substituted, or ethylenically unsaturated amides or imides,
- R' represents hydrogen or a hydrocarbonated radical having 1 to 40 carbon atoms, or an ionic or ionisable grouping, a phosphate, a phosphonate, a sulphate, a sulphonate, a carboxylic, or a primary, secondary or tertiary amine, or a quaternary ammonium, or their mixtures, or a mixture of several monomers of formula (I), c) optionally at least one monomer of an acrylamide or a methacrylamide, N-[3-(dimethylamino)propyl]acrylamide or N-[3-(dimethylamino)propyl]methacrylamide, and their mixtures, or at least one non-water soluble monomer chosen from alkyl acrylates or methacrylates, unsaturated esters, N-[2-(dimethylamino)ethyl]methacrylate, or N-[2-(dimethylamino)ethyl]acrylate, vinylics, vinyl acetate, vinylpyrrolidone, styrene, alphamethylstyrene, or at least one cationic monomer or quaternary ammonium chosen from [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or the mixture of several of these monomers, d) and optionally at least one crosslinking monomer chosen from ethylene glycol dimethacrylate, trimethylolpropanetriacrylate, allyl acrylate, allyl maleates, methylene-bis-acrylamide, methylene-bis-methacrylamide, tetrallyloxyethane, triallylcyanurates, allyl ethers obtained from polyols chosen from pentaerythritol, sorbitol, sucrose or others, or the mixture of several of these monomers.

18. The process according to claim 17, wherein the at least one anionic ethylenically unsaturated monomer comprises acrylic or methacrylic acid, diacid hemiesters, $C_1$ to $C_4$ monoesters of maleic or itaconic acids, or their mixtures, crotonic, isocrotonic, cinnamic, itaconic, maleic acid, or anhydrides of carboxylic acids, maleic anhydride, acrylamido-methyl-propane-sulphonic acid, sodium methallylsulphonate, vinyl sulphonic acid and styrene sulphonic acid, vinyl phosphoric acid, ethylene glycol methacrylate phosphate, propylene glycol methacrylate phosphate, ethylene glycol acrylate phosphate, propylene glycol acrylate phosphate and their ethoxylates, or vinyl phosphonic acid, or their mixtures.

19. The process according to claim 17, wherein $15 \leq (m+n+p)q \leq 120$.

20. The process according to claim 17, wherein R' represents a hydrocarbonated radical having 1 to 12 carbon atoms.

21. The process according to claim 17, wherein R' represents a hydrocarbonated radical having 1 to 4 carbon atoms.

22. The process according to claim 17, wherein said comb polymer comprises, expressed by weight:
   a) between 2% and 95% of the at least one anionic ethylenically unsaturated monomer,
   b) between 2% and 95% of the at least one monomer with non-ionic ethylenic unsaturation of formula (I),
   c) between 0% and 50% of the at least one monomer of an acrylamide or a methacrylamide, and
   d) between 0% and 3% of the at least one crosslinking monomer, where the total proportions of the constituents a), b), c) and d) is equal to 100%.

23. The process according to claim 22, wherein the amount of the at least one anionic ethylenically unsaturated monomer is between 5% and 90%.

24. The process according to claim 22, wherein the amount of the at least one monomer with non-ionic ethylenic unsaturation of formula (I) is between 5% and 90%.

25. The process according to claim 1, wherein the comb polymer is obtained by processes of radical copolymerisation in solution, in a direct or reverse emulsion, in suspension or in precipitation, or by controlled radical polymerisation processes, Reversible Addition Fragmentation Transfer (RAFT), Atom Transfer Radical Polymerization (ATRP), Nitroxide Mediated Polymerization (NMP) or Cobaloxime Mediated Free Radical Polymerization.

26. The process according to claim 1, wherein the comb polymer obtained in the acid form, and optionally distilled, is partially or totally neutralised by one or more neutralisation agents having a monovalent neutralising function or a polyvalent neutralising function.

27. The process according to claim 26, wherein the monovalent function is chosen from alkaline cations, sodium, potassium, lithium, ammonium or the primary, secondary or tertiary aliphatic and/or cyclic amines, stearylamine, ethanolamines (mono-, di-, triethanolamine), mono- and diethylamine, cyclohexylamine, methylcyclohexylamine, amino methyl propanol, morpholine, and the polyvalent function is chosen from alkaline earth divalent cations, magnesium, calcium, or zinc, trivalent cations, aluminium, or cations of higher valency.

28. The process according to claim 1, wherein the comb polymer derived from the polymerisation reaction, before or after the total or partial neutralisation reaction, is treated and separated into several phases, according to static or dynamic processes, by one or more polar solvents chosen from water, methanol, ethanol, propanol, isopropanol, the butanols, acetone, tetrahydrofuran or their mixtures.

29. A thermoplastic composition obtained by the process according to claim 1.

30. A thermoplastic composition for use in the manufacture of plastics, comprising:
   (a) at least one thermoplastic resin selected from halogenated resins, polyvinyl chloride (PVC), post-chlorinated vinyl polychloride (PVCC), vinylidene polyfluoride (PVDF), styrenic resins, styrene-butadiene copolymers, styrene-acrylonitrile resins, acrylate-butadiene-styrene resins, methylmethacrylate styrene copolymers, acrylic resins, methyl polymethacrylate, polyethylenes, polypropylenes, polycarbonate resins, unsaturated polyester resins, terephthalate polyethylene, terephthalate polybutylenes, polyurethane resins, polyamide resins, or a mixture thereof, (b) at least one mineral or carbonated filler, (c) optionally at least one thermal stabiliser and/or one UV stabiliser and/or one lubricant and/or one rheology modifier and/or one organic impact modifier, and (d) at least one comb polymer, containing at least one polyalkylene oxide function grafted on to at least one ethylenic unsaturated monomer, to improve the impact resistance of the thermoplastic composition, wherein the comb polymer comprises:
  (a) at least one anionic monomer with a carboxylic or dicarboxylic or phosphoric or phosphonic or sulphonic function, or their mixtures,
  (b) at least one non-ionic monomer, where the non-ionic monomer consists of at least one monomer of formula (I):

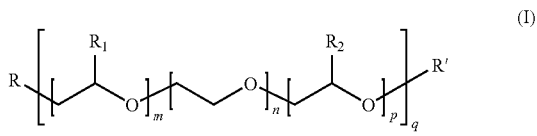

where:
  m and p represent a number of alkylene oxide units of less than or equal to 150,
  n represents a number of ethylene oxide units of less than or equal to 150,
  q represents an integer at least equal to 1 and such that $5 \leq (m+n+p)q \leq 150$,
  $R_1$ represents hydrogen or the methyl or ethyl radical,
  $R_2$ represents hydrogen or the methyl or ethyl radical,
  R represents a radical containing an unsaturated polymerisable function, chosen from vinylics, acrylic, methacrylic, maleic, itaconic, crotonic, vinylphthalic esters, or unsaturated urethanes, acrylurethane, methacrylurethane, $\alpha$-$\alpha'$ dimethyl-isopropenyl-benzylurethane, allylurethane, or allelic or vinylic ethers, whether or not substituted, or ethylenically unsaturated amides or imides,
  R' represents hydrogen or a hydrocarbonated radical having 1 to 40 carbon atoms, or an ionic or ionisable grouping chosen from a phosphate, a phosphonate, a sulphate, a sulphonate, a carboxylic, or a primary, secondary or tertiary amine, or a quaternary ammonium, or mixtures, or a mixture of several monomers of formula (I),
  (c) optionally at least one monomer of the acrylamide or methacrylamide type, N-[3-(dimethylamino)propyl] acrylamide or N-[3-(dimethylamino)propyl]methacrylamide, and their mixtures, or at least one non-water soluble monomer chosen from alkyl acrylates or methacrylates, the unsaturated esters, N-[2-(dimethylamino) ethyl]methacrylate, or N-[2-(dimethylamino)ethyl] acrylate, vinylics, vinyl acetate, vinylpyrrolidone, styrene, alphamethylstyrene, and their derivates, or at least one cationic monomer or quaternary ammonium, [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or mixtures thereof, and
  (d) optionally at least one monomer having at least two ethylenic unsaturations.

31. The thermoplastic composition according to claim 30, wherein the thermoplastic resin is chosen from halogenated resins, PVC, post-chlorinated vinyl polychloride (PVCC), vinylidene polyfluoride (PVDF), acrylic resins, methyl polymethacrylate, polycarbonate resins, unsaturated polyester resins, terephthalate polyethylene or terephthalate polybutylenes.

32. The thermoplastic composition according to claim 30, wherein the thermoplastic resin is PVC.

33. The thermoplastic composition according to claim 30, wherein the mineral or carbonated filler is chosen from natural or synthetic calcium carbonate, dolomites, kaolin, talc, gypsum, titanium oxide, satin white, aluminium trihydroxide, mica, carbon black, talc-calcium carbonate mixtures, calcium carbonate-kaolin mixtures, mixtures of calcium carbonate with aluminium trihydroxide, mixtures with synthetic natural fibres, mineral co-structures, or co-structures of talc-calcium carbonate or talc-titanium dioxide.

34. The thermoplastic composition according to claim 30, wherein the mineral or carbonated filler is natural or synthetic calcium carbonate or their mixtures.

35. The thermoplastic composition according to claim 30, wherein the mineral or carbonated filler is natural calcium carbonate chosen from marble, calcite, chalk or their mixtures.

36. The thermoplastic composition according to claim 30, which includes at least one other additive, and wherein the at least one other additive is an organic impact modifier chosen from impact additives comprising a core-shell, chlorinated polyolefines, styrene-butadiene rubbers (SBR), styrene-butadiene-styrenes (SBS), vinyl polyacetates, or their mixtures.

37. The thermoplastic composition according to claim 36, wherein the organic impact modifier is chosen from the impact additives comprising a core-shell of acrylic, styrenic, or butadienic.

38. The thermoplastic composition according to claim 36, wherein the impact modifier has an elastomer core comprising a polybutadiene and a shell comprising a polymethacrylate or polystyrene.

39. The thermoplastic composition according to claim 30, which comprises:
  (a) at least one thermoplastic resin,
  (b) between 0.1 and 90% by dry weight of at least one mineral or carbonated filler, compared to the total weight of the thermoplastic composition,
  (c) between 0 and 20% by dry weight of a thermal stabiliser and/or a UV stabiliser and/or a lubricant and/or a rheology modifier and/or an organic impact modifier, compared to the total weight of the thermoplastic formulation,
  (d) between 0.01 and 5% by dry weight of a comb polymer consisting of at least one ethylenic unsaturation monomer on to which is grafted at least one polyalkylene oxide function, compared to the dry weight of mineral or carbonated filler.

40. The thermoplastic composition according to claim 39, which comprises between 5 and 20%, by dry weight of a thermal stabiliser and/or a UV stabiliser and/or a lubricant and/or a rheology modifier and/or an organic impact modifier, compared to the total weight of the thermoplastic material.

41. The thermoplastic composition according to claim 39, which comprises between 0.1 and 3%, by dry weight of a comb polymer consisting of at least one ethylenic unsaturation monomer onto which is grafted at least one polyalkylene oxide function, compared to the dry weight of mineral or carbonated filler.

42. The thermoplastic composition according to claim 30, wherein $15 \leq (m+n+p)q \leq 120$.

43. The thermoplastic composition according to claim 30, wherein R' represents a hydrocarbonated radical having 1 to 12 carbon atoms.

44. The thermoplastic composition according to claim 30, wherein R' represents a hydrocarbonated radical having 1 to 4 carbon atoms.

45. The thermoplastic composition according to claim 30, wherein the comb polymer comprises:
   a) at least one anionic ethylenically unsaturated monomer chosen from ethylenic unsaturation monomers having a monocarboxylic function, or ethylenically unsaturated monomers having a dicarboxylic function, or ethylenically unsaturated monomers having a sulphonic function, or ethylenically unsaturated monomers having a phosphoric function, or ethylenically unsaturated monomers having a phosphonic function, or their mixtures,
   b) at least one monomer with a non-ionic ethylenic unsaturation of formula (I):

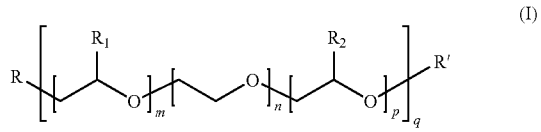

where:
   m and p represent a number of alkylene oxide units of less than or equal to 150,
   n represents a number of ethylene oxide units of less than or equal to 150,
   q represents a whole number at least equal to 1 and such that $5 \leq (m+n+p)q \leq 150$,
   $R_1$ represents hydrogen or the methyl or ethyl radical,
   $R_2$ represents hydrogen or the methyl or ethyl radical,
   R represents a radical containing an unsaturated polymerisable function, chosen from vinylics, or acrylic, methacrylic, maleic, itaconic, crotonic, vinylphthalic esters, or unsaturated urethanes, acrylurethane, methacrylurethane, α-α' dimethyl-isopropenyl-benzylurethane, allylurethane, or allylic or vinylic ethers, whether or not substituted, or ethylenically unsaturated amides or imides,
   R' represents hydrogen or a hydrocarbonated radical having 1 to 40 carbon atoms, or an ionic or ionisable grouping, phosphate, a phosphonate, a sulphate, a sulphonate, a carboxylic, or a primary, secondary or tertiary amine, or a quaternary ammonium, or their mixtures,
   or a mixture of several monomers of formula (I),
   c) optionally at least one monomer of an acrylamide or a methacrylamide, N-[3-(dimethylamino)propyl]acrylamide or N-[3-(dimethylamino)propyl]methacrylamide, and their mixtures, or at least one non-water soluble monomer chosen from alkyl acrylates or methacrylates, unsaturated esters, N-[2-(dimethylamino)ethyl]methacrylate, or N-[2-(dimethylamino)ethyl]acrylate, vinylics, vinyl acetate, vinylpyrrolidone, styrene, alphamethylstyrene, or at least one cationic monomer or quaternary ammonium chosen from [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate,
   or the mixture of several of these monomers,
   d) and optionally at least one crosslinking monomer chosen from ethylene glycol dimethacrylate, trimethylolpropanetriacrylate, allyl acrylate, allyl maleates, methylene-bis-acrylamide, methylene-bis-methacrylamide, tetrallyloxyethane, triallylcyanurates, allyl ethers obtained from polyols chosen from pentaerythritol, sorbitol, sucrose or others,
   or the mixture of several of these monomers.

46. The thermoplastic composition according to claim 45, wherein the at least one anionic ethylenically unsaturated monomer comprises acrylic or methacrylic acid, diacid hemiesters, $C_1$ to $C_4$ monoesters of maleic or itaconic acids, or their mixtures, crotonic, isocrotonic, cinnamic, itaconic, maleic acid, or anhydrides of carboxylic acids, maleic anhydride, acrylamido-methyl-propane-sulphonic acid, sodium methallylsulphonate, vinyl sulphonic acid and styrene sulphonic acid, vinyl phosphoric acid, ethylene glycol methacrylate phosphate, propylene glycol methacrylate phosphate, ethylene glycol acrylate phosphate, propylene glycol acrylate phosphate and their ethoxylates, or vinyl phosphonic acid, or their mixtures.

47. The thermoplastic composition according to claim 45, wherein $15 \leq (m+n+p)q \leq 120$.

48. The thermoplastic composition according to claim 45, wherein R' represents a hydrocarbonated radical having 1 to 12 carbon atoms.

49. The thermoplastic composition according to claim 45, wherein R' represents a hydrocarbonated radical having 1 to 4 carbon atoms.

50. The thermoplastic composition according to claim 45, wherein said comb polymer comprises, expressed by weight:
   a) between 2% and 95% of the at least one anionic ethylenically unsaturated monomer,
   b) between 2% and 95% of the at least one monomer with non-ionic ethylenic unsaturation of formula (I),
   c) between 0% and 50% of the at least one monomer of an acrylamide or a methacrylamide,
   d) between 0% and 3% of the at least one crosslinking monomer
   where the total proportions of the constituents a), b), c) and d) is equal to 100%.

51. The thermoplastic composition according to claim 50, wherein the amount of the at least one anionic ethylenically unsaturated monomer is between 5% and 90%.

52. The thermoplastic composition according to claim 50, wherein the amount of the at least one monomer with non-ionic ethylenic unsaturation of formula (I) is between 5% and 90%.

53. The thermplastic composition according to claim 30, wherein the comb polymer is obtained by processes of radical copolymerisation in solution, in a direct or reverse emulsion, in suspension or in precipitation, or by controlled radical polymerisation processes, Reversible Addition Fragmentation Transfer (RAFT), Atom Transfer Radical Polymerization (ATRP), Nitroxide Mediated Polymerization (NMP) or Cobaloxime Mediated Free Radical Polymerization.

54. The thermoplastic composition according to claim 30, wherein the comb polymer obtained in the acid form, and optionally distilled, is partially or totally neutralised by one or more neutralisation agents having a monovalent neutralising function or a polyvalent neutralising function.

55. The thermoplastic composition according to claim 54, wherein the monovalent function is chosen from alkaline cations, sodium, potassium, lithium, ammonium or the primary, secondary or tertiary aliphatic and/or cyclic amines, stearylamine, ethanolamines (mono-, di-, triethanolamine), mono- and diethylamine, cyclohexylamine, methylcyclohexylamine, amino methyl propanol, morpholine, and the polyvalent function is chosen from alkaline earth divalent cations, magnesium, calcium, or zinc, trivalent cations, aluminium, or cations of higher valency.

56. The process according to claim 1, wherein the comb polymer is obtained by controlled radical polymerization of methoxy polyethylene glycol methacrylate and acrylic acid.

57. The process according to claim 1, wherein the comb polymer is obtained by controlled radical polymerization of methoxy polyethylene glycol methacrylate, acrylic acid, methacrylic acid and butoxypolyoxypropylene hemimaleate containing oxypropylene.

58. The process according to claim 1, wherein the comb polymer is obtained by controlled radical polymerization of methoxy polyethylene glycol methacrylate, ethylene glycol methacrylate phosphate, methacrylic acid and butoxypolyoxypropylene hemimaleate containing oxypropylene.

59. The process according to claim 1, wherein the comb polymer is obtained by controlled radical polymerization of methoxy polyethylene glycol methacrylate, acrylic acid, methacrylic acid, stearyl methacrylate and butoxypolyoxypropylene hemimaleate containing oxypropylene.

60. The process according to claim 1, wherein the comb polymer is obtained by controlled radical polymerization of methoxy polyethylene glycol methacrylate, acrylic acid, methacrylic acid, tristyrylphenol methacrylate and butoxypolyoxypropylene hemimaleate containing oxypropylene.

61. The process according to claim 1, wherein the comb polymer is obtained by controlled radical polymerization of methoxy polyethylene glycol methacrylate, acrylic acid, methacrylic acid, methacroyloxyethyltrimethylammonium chloride and butoxypolyoxypropylene hemimaleate containing oxypropylene.

62. The process according to claim 1, wherein the comb polymer is obtained by controlled radical polymerization of methoxy polyethylene glycol methacrylate, methacrylic acid and butoxypolyoxypropylene hemimaleate containing oxypropylene.

63. The thermoplastic composition according to claim 30, wherein the comb polymer is obtained by controlled radical polymerization of methoxy polyethylene glycol methacrylate and acrylic acid.

64. The thermoplastic composition according to claim 30, wherein the comb polymer is obtained by controlled radical polymerization of methoxy polyethylene glycol methacrylate, acrylic acid, methacrylic acid and butoxypolyoxypropylene hemimaleate containing oxypropylene.

65. The thermoplastic composition according to claim 30, wherein the comb polymer is obtained by controlled radical polymerization of methoxy polyethylene glycol methacrylate, ethylene glycol methacrylate phosphate, methacrylic acid and butoxypolyoxypropylene hemimaleate containing oxypropylene.

66. The thermoplastic composition according to claim 30, wherein the comb polymer is obtained by controlled radical polymerization of methoxy polyethylene glycol methacrylate, acrylic acid, methacrylic acid, stearyl methacrylate and butoxypolyoxypropylene hemimaleate containing oxypropylene.

67. The thermoplastic composition according to claim 30, wherein the comb polymer is obtained by controlled radical polymerization of methoxy polyethylene glycol methacrylate, acrylic acid, methacrylic acid, tristyrylphenol methacrylate and butoxypolyoxypropylene hemimaleate containing oxypropylene.

68. The thermoplastic composition according to claim 30, wherein the comb polymer is obtained by controlled radical polymerization of methoxy polyethylene glycol methacrylate, acrylic acid, methacrylic acid, methacroyloxyethyltrimethylammonium chloride and butoxypoloxypropylene hemimaleate containing oxypropylene.

69. The thermoplastic composition according to claim 30, wherein the comb polymer is obtained by controlled radical polymerization of methoxy polyethylene glycol methacrylate, methacrylic acid and butoxypolyoxypropylene hemimaleate containing oxypropylene.

* * * * *